United States Patent
Padmanabhan et al.

(10) Patent No.: US 10,341,408 B2
(45) Date of Patent: *Jul. 2, 2019

(54) TRANSPORT PATH-AWARE QUALITY OF SERVICE FOR MOBILE COMMUNICATIONS

(71) Applicant: VIASAT, INC., Carlsbad, CA (US)

(72) Inventors: Veena Padmanabhan, San Diego, CA (US); Nirmalkumar Velayudhan, San Marcos, CA (US)

(73) Assignee: VIASAT, INC., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/893,344

(22) Filed: Feb. 9, 2018

(65) Prior Publication Data

US 2018/0227350 A1     Aug. 9, 2018

Related U.S. Application Data

(63) Continuation of application No. 14/948,002, filed on Nov. 20, 2015, now Pat. No. 9,930,091.

(60) Provisional application No. 62/114,162, filed on Feb. 10, 2015.

(51) Int. Cl.
*G06F 15/16* (2006.01)
*H04L 29/06* (2006.01)
(Continued)

(52) U.S. Cl.
CPC ......... *H04L 65/80* (2013.01); *H04B 7/18508* (2013.01); *H04B 7/18584* (2013.01);
(Continued)

(58) Field of Classification Search
USPC .................. 709/235, 220, 223, 224, 225
See application file for complete search history.

(56) References Cited

U.S. PATENT DOCUMENTS

| | | | |
|---|---|---|---|
| 5,664,006 | A | 9/1997 | Monte et al. |
| 5,812,538 | A | 9/1998 | Wiedeman et al. |
| | (Continued) | | |

FOREIGN PATENT DOCUMENTS

| | | |
|---|---|---|
| WO | WO-2014/124753 A1 | 8/2014 |
| WO | WO-2016/130476 A1 | 8/2016 |

OTHER PUBLICATIONS

Durresi et al., "Routing of Real-time Traffic in a Transformational Communications Architecture", IEEE, 2003, 19 pgs.
(Continued)

*Primary Examiner* — Lan Dai T Truong
(74) *Attorney, Agent, or Firm* — Kilpatrick Townsend & Stockton LLP

(57) ABSTRACT

Embodiments provide quality of service for media content delivery over capacity-constrained communications links to user devices by exploiting usage models and path awareness. For example, one or more uncongested beams can be identified as preceding one or more congested beams (e.g., by computing a congestion map) along a predicted transport path of a user device moving through a multi-beam satellite communications system. A prediction can be made aps to one or more future requests that are likely to be made by the user device for pre-positionable types of media content, and that are likely to be serviced by one of the subsequent congested beams. When such a request for pre-positionable media content is predicted, embodiments can schedule transmission of at least a portion of the media content over one or more of the preceding uncongested beams for storage local to the user device, thereby pre-positioning the content at the client prior to reaching the congested beam.

32 Claims, 8 Drawing Sheets

(51) Int. Cl.
*H04L 29/08* (2006.01)
*H04W 4/029* (2018.01)
*H04W 4/18* (2009.01)
*H04B 7/185* (2006.01)
*H04B 7/204* (2006.01)
*H04W 84/06* (2009.01)

(52) U.S. Cl.
CPC ....... *H04B 7/2041* (2013.01); *H04L 65/4069* (2013.01); *H04L 67/2842* (2013.01); *H04W 4/029* (2018.02); *H04W 4/18* (2013.01); *H04W 84/06* (2013.01)

(56) References Cited

U.S. PATENT DOCUMENTS

| | | |
|---|---|---|
| 6,246,874 B1 | 6/2001 | Voce |
| 6,522,636 B1 | 2/2003 | Hogberg et al. |
| 7,379,758 B2 | 5/2008 | Schiff et al. |
| 8,107,875 B2 | 1/2012 | Miller |
| 8,712,321 B1 | 4/2014 | Dankberg |
| 8,868,069 B2 | 10/2014 | Bennett et al. |
| 9,930,091 B2 | 3/2018 | Padmanabhan et al. |
| 2012/0009890 A1 | 1/2012 | Curcio et al. |
| 2013/0109376 A1 | 5/2013 | Roos et al. |
| 2013/0244572 A1 | 9/2013 | Angeletti et al. |
| 2014/0199980 A1 | 7/2014 | Rao et al. |
| 2016/0234281 A1 | 8/2016 | Padmanabhan et al. |

OTHER PUBLICATIONS

Jang et al., "Satellite Beam Handover Strategy to Improve Return Link Resource Utilization", International Journal of Wireless & Mobile Networks (IJWMN), vol. 3, No. 5, Oct. 2011, pp. 113-124.

International Search Report and Written Opinion mailed in International (PCT) Application No. PCT/US2016/017001 dated Apr. 26, 2016, 11 pgs.

International Preliminary Report on Patentability mailed in International (PCT) Application No. PCT/US2016/017001 dated Aug. 24, 2017, 7 pgs.

TRANSPORT PATH-AWARE QUALITY OF SERVICE FOR MOBILE COMMUNICATIONS

CROSS-REFERENCE TO RELATED APPLICATIONS

This application is a continuation of U.S. Nonprovisional application Ser. No. 14/948,002, titled, "TRANSPORT PATH-AWARE QUALITY OF SERVICE FOR MOBILE COMMUNICATIONS," filed Nov. 20, 2015, which is a is a non-provisional of, and claims priority to U.S. Provisional Patent Application No. 62/114,162, titled, "Time Based Network Load Balancing," filed Feb. 10, 2015, which is incorporated herein by reference in its entirety.

FIELD

Embodiments relate generally to communications systems, and, more particularly, to providing quality of service for delivery of media content over capacity-constrained communications links to in-transport terminals by exploiting usage models and path awareness.

BACKGROUND

As usage of the Internet evolves, there has tended to be an increasing prevalence of high-data rate applications, such as streaming video. The ability of communications service providers to serve consumers with data-intensive content can be limited by variations in capacity and demand across the communications infrastructure. For example, network resource demand can spike during peak usage times of day, capacity in certain regions can be impacted by weather (e.g., rain fade, etc.), consumers in certain regions may have access to different infrastructures (e.g., fiber, satellite, etc.), and/or the ability to meet demand can change based on other conditions.

It is becoming more common for users to desire to consume streaming media content while in transit (e.g., on mobile devices, like mobile phones, laptop computers, tablet computers, integrated media terminals, or other in-transport terminals; and/or in context of a car, airplane, bus, cruise ship, or other transport craft). Maintaining provision of communications services to mobile terminals can involve handing off the connection with the content provider network among multiple wireless links (e.g., multiple spot beams or cells), contending with changing connection quality (e.g., as a terminal changes its position relative to spot beams or cells, to sources of interference, etc.), adapting to changing network resource supply and/or demand (e.g., user demand in a particular spot beam coverage area at a particular time, etc.), and other difficulties. These and other attributes of in-transport content delivery can frustrate the network operator's ability to maintain quality of service to the mobile terminals, particularly in context of aircraft and/or other transport craft that tend to travel over a relatively large area of the network in a relatively short time.

BRIEF SUMMARY

Among other things, systems and methods are described for providing quality of service for delivery of media content over capacity-constrained communications links to in-transport terminals by exploiting usage models and path awareness. Embodiments operate in context of mobile terminals moving through a communications infrastructure having a number of beams (e.g., or cells, or any other suitable type of carriers). As the terminal moves through communications infrastructure, it may be serviced over time by beams that are more or less heavily loaded. For example, a lightly loaded beam may be uncongested, so that excess capacity is available above fulfilling current and/or expected bandwidth demands (e.g., with some level of confidence); while a heavily loaded beam may be congested, so that it may be difficult to fulfill bandwidth demands.

Embodiments can identify one or more uncongested beams as preceding one or more congested beams along a predicted transport path of the terminal (e.g., the terminal is presently serviced by an uncongested beam, or is predicted to be serviced subsequently by an uncongested beam; and the terminal is predicted to be serviced at some subsequent time by a congested beam). For example, embodiments can compute a congestion map that indicates predicted congestion conditions for some or all beams (e.g., spot beams) along the predicted transport path of the terminal. In such instances, a prediction can be made as to future consumption likely to be made by user devices associated with the terminal for pre-positionable types of media content items or portions of the items, and that are likely to be serviced by one of the subsequent congested beams. For example, if a user is presently streaming a movie via the terminal, a prediction can be made as to whether portions of the movie are likely to be streaming when the terminal is later serviced by a congested beam. When such a future consumption for pre-positionable media content is predicted, embodiments can schedule transmission of at least a portion of the pre-positionable media content over one or more of the preceding uncongested beams for storage in a local data store in communication with the terminal. In this way, the media content can be pre-positioned at the terminal prior to the terminal being serviced by the congested beam.

BRIEF DESCRIPTION OF THE DRAWINGS

The present disclosure is described in conjunction with the appended figures.

In the appended figures, similar components and/or features can have the same reference label. Further, various components of the same type can be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are set forth to provide a thorough understanding of the present invention. However, one having ordinary skill in the art should recognize that the invention can be practiced without these specific details. In some instances, circuits, structures, and techniques have not been shown in detail to avoid obscuring the present invention.

Figure 1:
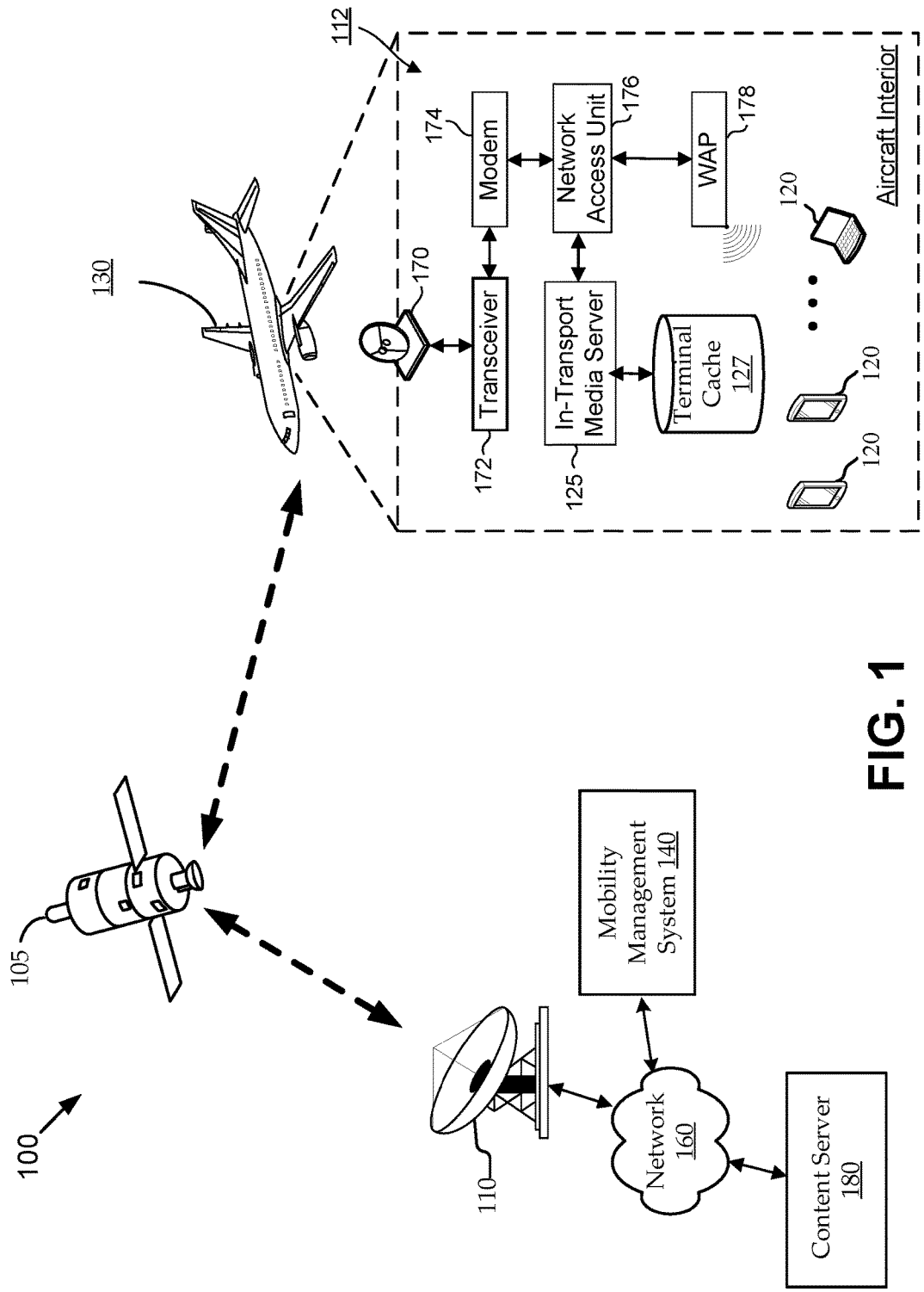
FIG. 1 shows a simplified diagram of a satellite communications system 100, which provides a context for various embodiments.

FIG. 1 shows a simplified diagram of a satellite communications system 100, which provides a context for various embodiments. May other configurations are possible having more or fewer components than the satellite communications system 100 of FIG. 1. In the illustrated embodiment, the satellite communications system 100 includes an aircraft 130 in communication with a content server 180 via a satellite 105, a gateway 110, and a network 160.

The aircraft 130 can include a mobile terminal 112 to facilitate bidirectional communication with the satellite 105. In the illustrated embodiment, the mobile terminal 112 includes an antenna system 170, transceiver 172, modem 174, network access unit 176, wireless access point (WAP) 178, in-transport media server 125, and terminal cache 127. Although only one aircraft 130 is illustrated in FIG. 1 to avoid over complication of the drawing, the satellite communications system 100 can include many more aircraft 130 as well as other types of terminals such as fixed terminals.

The mobile terminal 112 can provide for reception of a forward downlink signal from the satellite 105 and transmission of a return uplink signal to the satellite 105 to support two-way data communications between user devices 120 within the aircraft 130 and the satellite 105. The user devices 120 can include mobile devices (e.g., smartphones, laptops, tablets, netbooks, and the like) such as personal electronic devices (PEDs) brought onto the transport craft 130 by passengers. As further examples, the user devices 120 can also or alternatively include passenger seat back systems or other devices on the aircraft 130. The user devices 120 can communicate with the network access unit 176 via a communication link that can be wired and/or wireless. The communication link can be, for example, part of a local area network such as a wireless local area network (WLAN) support by WAP 178. One or more WAPs 178 can be distributed about the aircraft 130, and can, in conjunction with network access unit 176, provide traffic switching and routing functionality; for example, as part of a WLAN extended service set (ESS), etc.

In operation, the network access unit 176 can provide uplink data received from the user devices 120 to the modem 174 to generate modulated uplink data (e.g., a transmit intermediate frequency (IF) signal) for delivery to the transceiver 172. The transceiver 172 can upconvert and then amplify the modulated uplink data to generate the return uplink signal for transmission to the satellite 105 via the antenna system 170. Similarly, the transceiver 172 can receive the forward downlink signal from the satellite 105 via the antenna system 170. The transceiver 172 can amplify and downconvert the forward downlink signal to generate modulated downlink data (e.g., a receive IF signal) for demodulation by the modem 174. The demodulated downlink data from the modem 174 can be provided to the network access unit 176 for routing to the appropriate user devices 120. The modem 174 can be integrated with the network access unit 176, or can be a separate component in some examples.

The satellite communications system 100 includes satellite 105. Although only one satellite 105 is illustrated in FIG. 1 to avoid over complication of the drawing, the satellite communications system 100 can include multiple satellites 105, each satellite providing coverage for a service area, where service areas for different satellites are non-overlapping or overlapping. The satellite communications system 100 can be any suitable type of satellite system, including a geostationary satellite system, medium earth orbit satellite system, low earth orbit satellite system, or combinations thereof. In embodiments, the satellite 105 has a number of beams directed at different regions on Earth, where the coverage area of each beam may be non-overlapping or overlapping with one or more other beams. The satellite 105 can for example have one or more spot beams covering different regions on Earth within the service area of the satellite 105. As another example, the satellite 105 can have one or more wide area coverage beams covering the service area of the satellite 105. As yet another example, the satellite 105 can have a combination of spot beams and wide area coverage beams.

The satellite 105 provides bidirectional communication between mobile terminal 112 of the the aircraft 130 and one or more gateways 110. In embodiments, the satellite 105 operates in a multi-spot beam mode, having a number of spot beams each directed at a different region of the earth. This can allow coverage of a relatively large geographical area and frequency re-use within the service area of the satellite 105.

The gateway 110 is sometimes referred to as a hub or ground station. The gateway 110 includes an antenna to transmit a forward link uplink signal to the satellite 105 and receive a return downlink signal from the target satellite 110. The gateway 110 also includes memory for storage of data and software applications, a processor for accessing data and executing applications, and components that facilitate communication over the network 160 and with the satellite 105. The gateway 110, in conjunction with the mobility management system 140 (discussed below), can also schedule traffic to the aircraft 130 using the techniques described herein. Alternatively, the scheduling can, in conjunction with the mobility management system 140, be performed by a scheduler system within other parts of the satellite communications system 100 (e.g., a core node, satellite access node, or other components, not shown).

The gateway 110 can be provided as an interface between the network 160 and the satellite 105. The gateway 110 can be configured to receive data and information directed to the user devices 120 onboard the aircraft 130 from a source (e.g., content server 180) accessible via the network 160. The gateway 110 can format the data and information and transmit a forward uplink signal to the satellite 105 for subsequent delivery to the aircraft 130. Similarly, the gateway 110 can be configured to receive a return downlink signal from the satellite 105 (e.g., containing data and information originating from the aircraft 130) that is directed to a destination accessible via the network 160. The gateway 110 can also format the received return downlink signal for transmission on the network 135.

The network 160 can be any type of network and can include for example, the Internet, an IP network, an intranet, a wide area network (WAN), local area network (LAN), a virtual private network (VPN), a virtual LAN (VLAN), a fiber optic network, a cable network, a public switched telephone network (PSTN), a public switched data network (PSDN), a public land mobile network, and/or any other type of network supporting communication as described herein. The network 160 can include both wired and wireless connections as well as optical links.

The satellite 105 can receive the forward uplink signal from the gateway 110 and transmit corresponding forward downlink signal to the aircraft 130. Similarly, the satellite 105 can receive return uplink signal from the aircraft 130 and transmit corresponding return downlink signal to the gateway 110. The satellite 105 can be configured as a "bent pipe" satellite that performs frequency and polarization conversion of the received signals before retransmission of the signals to the destination. As another example, the satellite 105 can be configured as a regenerative satellite that demodulates and remodulates the received signals before retransmission.

User devices 120 can execute one or more applications that allow the users onboard the aircraft 130 to communicate with the content server 180 to obtain and consume particular media content items in a streaming (or progressively downloaded) manner via the network 160, gateway 110, satellite 105 and mobile terminal 112. The functions of the content server 180 can be implemented in hardware, instructions embodied in memory and formatted to be executed by one or more general or application-specific processors, firmware, or any combination thereof. The content server 180 can store, or otherwise provide access to, a library of media content items available for selection and subsequent streaming to the users of the user devices 120. A media content item can be for example an audio-video item such as a movie or television (TV) show, an audio-only item such as a song, or other type of streaming media content. Although only one content server 180 is illustrated in FIG. 1 to avoid over complication of the drawing, the satellite communications system 100 may include many content servers 180. Each content server 180 may for example be associated with different streaming media content providers.

The users of the user devices 120 can for example be subscribers of a streaming media service provided by the content server 180. As another example, the content server 180 may not require a subscription to access the library of media content items. As yet another example, the subscription to the library may be associated with the aircraft 130.

As described in more detail below, the satellite communications system 100 includes a mobility management system 140 to manage and distribute the media content items from the content server 180 to the user devices 120 as the aircraft 130 moves through the satellite communications system 100. The mobility management system 140 is configured to provide high-quality, continuous streaming service to users onboard the aircraft 130 using the techniques described herein. The functions of the mobility management system 140 can be implemented in hardware, instructions embodied in memory and formatted to be executed by one or more general or application-specific processors, firmware, or any combination thereof.

During flight, the aircraft 130 can move "through" multiple beams of the satellite communications system 100. For example, during a domestic or international airplane flight, the aircraft 130, and thus the user devices 120 of users onboard the aircraft 130, may move through a number of spot beam coverage areas of the satellite communications system 100 (e.g., and may even move between multiple beam coverage areas supported by multiple satellites). While the aircraft 130 is being serviced by a particular spot beam while within its spot beam coverage area, that particular spot beam may also be servicing demand from many other terminals (e.g., fixed terminals and/or user devices 120 associated with other mobile terminals 112) in the spot beam coverage area, and that demand can differ (potentially by a lot) across the multiple spot beams.

While those user devices 120 are moving through multiple beams of the satellite communications system 100, users may be consuming communications services (e.g., streaming media, otherwise requesting and receiving content, etc.) from various locations accessible via the network 160. Embodiments can provide a level of quality of service (QoS) to those user devices 120, even as they pass through beam service coverage areas that are more or less heavily loaded, referred to herein as having different levels of congestion. As used herein, a beam is considered "congested" when a committed amount of data to be communicated via the beam over a predetermined period of time (i.e., "demand") is greater than or equal to the amount of data the beam is capable of communicating over that predetermined period of time (i.e., "supply"), or some offset thereof. For example, a beam can be considered "congested" when the committed data reaches a certain level (e.g., 85%) of the amount of data it is capable of communicating over a predetermined period of time. In some embodiments, portions of a beam's capacity may be allocated to particular purposes, so that congestion can be further defined in context of demand versus supply of a particular type of traffic and/or a particular type of terminal. According to such definitions, a beam can be considered as having available (or excess) capacity when it is uncongested. In some embodiments, one or more levels of congested and one or more levels of uncongested may be defined based on different levels of the committed amount of data or other metric.

As described in more detail below, using the techniques described herein the mobility management system 140 can predict that an upcoming beam will be congested during the service timeframe for which the aircraft 130 is expected to be within the coverage area of an upcoming congested beam. In response to the prediction, the mobility management system 140 can then determine media content portions that are likely to be consumed by the user devices 120 when the aircraft 130 is expected to be serviced by the upcoming congested beam. The mobility management system 140 can then schedule the media content portions for transmission to the aircraft 130 via one or more beams preceding the upcoming congested beam. In other words, the mobility management system 140 can pre-position the media content portions for storage local to the aircraft 130, prior to the time when the media content portions will likely be consumed by the user devices 120. The media content portions can be received by the mobile terminal 112 of the aircraft 130 and stored within a terminal cache 127 local the aircraft 130, for subsequent delivery and consumption by the user devices 120 when the aircraft 130 is being serviced by the upcoming congested beam. The functions of the mobility management system 140 can be implemented in hardware, instructions embodied in memory and formatted to be executed by one or more general or application-specific processors, firmware, or any combination thereof.

In FIG. 1, the mobility management system 140 is shown in communication with provider-side nodes of the multi-beam communications system 110. In particular, the mobility management system 140 is shown in communication with the gateway 110 via the network 160. In other embodiments, the mobility management system 140 can be directly or indirectly in communication with a gateway 110, core node, or any other suitable node of the provider-side communications infrastructure. In yet other embodiments, some or all the functionality of the mobility management system 140 can be implemented within consumer-side infrastructure as described in more detail below.

As mentioned above, one or more terminal caches 127 are onboard the aircraft 130 for storing and serving the pre-positioned media content portions. The terminal cache 127 can be implemented in any suitable way that provides storage local to the aircraft 130, including as one or more data servers, solid state memory, hard disk drives, removable storage, shared storage, etc. In some embodiments, a user device 120 can have its own terminal cache 127, for example, as a computer-readable medium coupled with, or integrated into, the user device 120. In other embodiments, the terminal cache 227 can be coupled with, or integrated into, in-transport server 125 or other component of mobile terminal 112, which is then in communication with one or more user devices 120. Upon consumption of a pre-positioned media content portion by the appropriate user device 120, the pre-positioned media content portion may be purged from the terminal cache 227 so that space can be used to store subsequent pre-positionable media content.

The in-transport media server 125 can provide commands to the network access unit 176 to manage and distribute media content items from the content server 180 to the user devices 120 using the techniques described herein. In particular, the in-transport media server 125 can provide for on-board media distribution of the pre-positioned media content portions within the terminal cache 127 to the user devices 120 at the appropriate time. The in-transport media server 125 can include one or more media servers, media storage devices, etc. The functions of the in-transport media server 125 can be implemented in hardware, instructions embodied in memory and formatted to be executed by one or more general or application-specific processors, firmware, or any combination thereof. In the illustrated embodiment, the in-transport media server 125 is shown as a separate device. Alternatively, some or all of the components or features of the in-transport media server 125 can be implemented within one or more other components of the mobile terminal 112.

In the illustrated embodiment, the user devices 120 are onboard aircraft 130, which is an airplane in this example. Alternatively, the user devices 120 may be onboard other types of transport craft vehicles such as a train, bus, cruise ship, other type of aircraft such as a helicopter, etc.

Embodiments are described in context of multi-beam satellite communications systems, which generally include any suitable communications environment in which mobile terminal communications can be serviced by multiple beams as the mobile terminal 112 travels through the network. However, reference to satellite architectures is not intended to be limiting, and novel aspects described herein can be implemented with any one or more suitable communications architecture(s) including any suitable communications links, such as satellite communications systems, air-to-ground communication systems, hybrid satellite and air-to-ground communications systems, cellular communications systems, etc. Typically, because of the mobile nature of the mobile terminal 112, the communications architecture will likely involve at least one wireless communications link. Such wireless links can be generally referred to as "carriers." For the sake of clarity, some embodiments are described with reference to "beams" or "spot beams" in a multi-beam satellite communications system. For example, each spot beam can service a particular spot beam coverage area, and user devices 120 associated with a mobile terminal 112 within the spot beam coverage areas can transmit and receive data via one or more frequency bands and/or polarizations. However, reference to multi-beam satellite architectures is not intended to be limiting, and novel aspects described herein can be implemented in any suitable multi-carrier communications system. For example, the carriers can be cells of a cellular communications network, and user devices 120 associated with mobile terminal 112 within those cells' coverage areas can transmit and receive data via one or more cellular frequency bands.

Figure 2A:
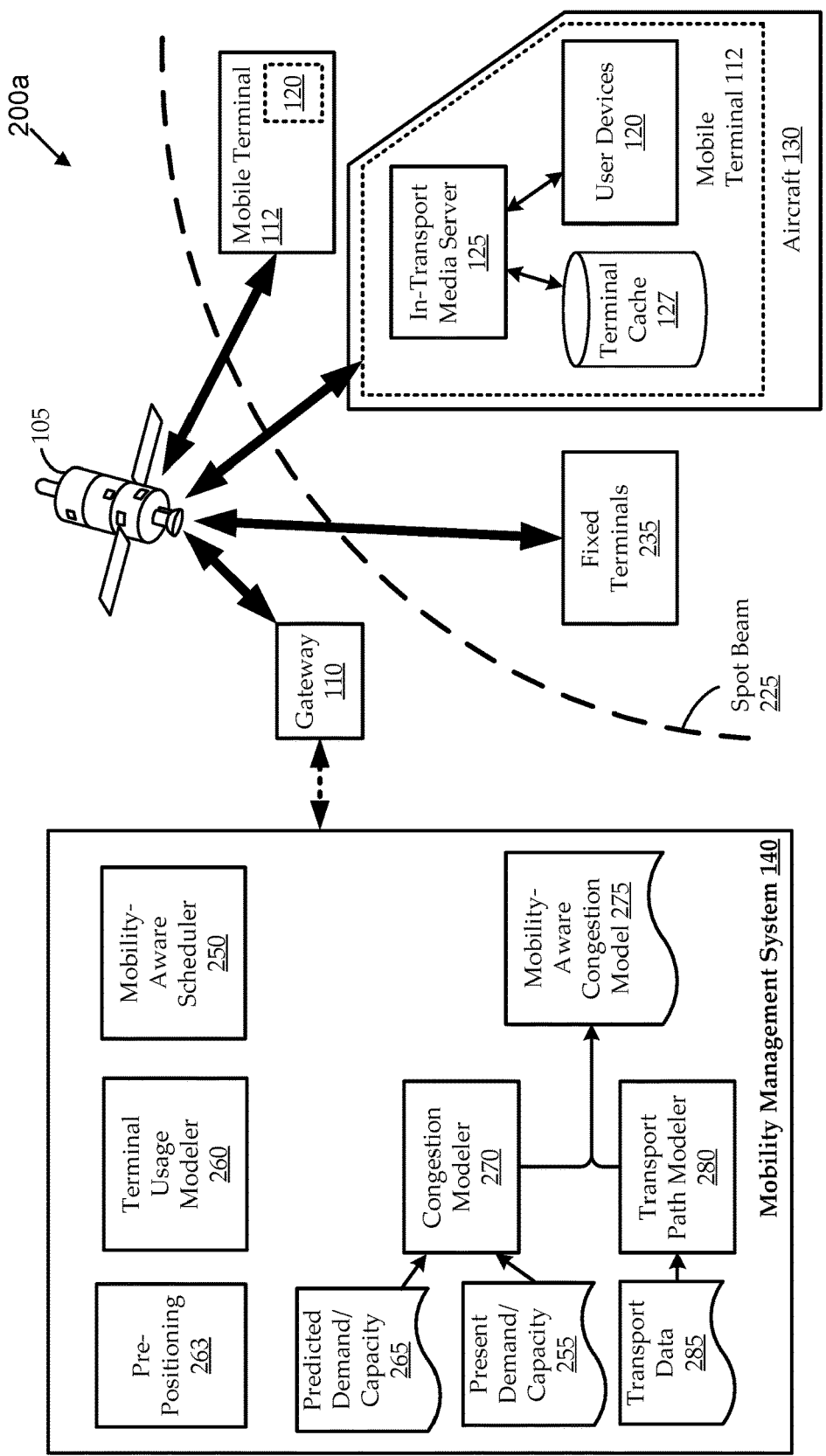
FIGS. 2A and 2B show simplified diagrams of a multi-beam communications system, which provides a context for various embodiments.

FIG. 2A shows a simplified diagram of a multi-beam satellite communications system 200a, which provides a context for various embodiments. The satellite communications system 200a can be an embodiment of the communications system 100 described with reference to FIG. 1 or any other suitable multi-carrier communications system. The illustrated satellite communications system 200a includes one or more gateways 110 that provide communications services via one or more satellites 105 to multiple terminals within the coverage areas of one or more spot beams 225. Each spot beam 225 can communicate with many terminals using one or more frequencies, polarizations, etc. The illustrated single spot beam 225 can represent one of multiple satellite spot beams 225 of the satellite communications system 200a. Each spot beam 225 can be allocated a certain amount of capacity (e.g., statically or dynamically) with which it can service demands of potentially large numbers of terminals within its coverage area. Typically, communications service providers can attempt to allocate and manage the "supply" (availability) of capacity provided via a spot beam 225 in a manner that seeks to meet the demands of customers serviced by the spot beam 225. However, many factors can frustrate those attempts. For example, capacity supply may be impacted by various factors, such as infrastructure limitations (e.g., each spot beam 225 can only support a certain maximum throughput, bandwidth, etc.) and weather (e.g., raid fade can impact effective capacity); and capacity demand can be impacted by various factors, such as number of terminals being serviced by the spot beam 225 and time of day (e.g., high demand during peak busy hour relative to other times of day).

Many different types of terminals may be serviced by a particular beam (e.g., spot beam 225). For example, terminals can generally be categorized as "fixed" terminals 235 and "mobile" terminals 112. Fixed terminals 235 generally include any set of customer premises equipment for communicating with the satellite 105 (or base station, etc.) that has a substantially fixed location. For example, a satellite antenna and satellite modem installed at a customer's residence or place of business can be considered as a fixed terminal 235, even though the customer may interface with the fixed terminal 235 using a mobile device (e.g., a laptop computer, a tablet computer, a smart phone, etc.).

Mobile terminals 112 can generally include any set of equipment that permits communicating with the satellite 105 (or base station, etc.) during movement of the mobile terminal 112. In one context, mobile terminals 112 can include mobile end-user devices that are in communication with the communications system 200a using their own mobile communications infrastructure (i.e., without going through an intermediary). For example, such a mobile terminal 112 can be a satellite-capable smart phone (e.g., a "satphone"), a portable computer with an on-board (e.g., installed, removable, etc.) satellite modem and antenna, etc. Some such mobile terminals 112 can implement instances of user devices 120.

In another context, mobile terminals 112 onboard the aircraft 130 can provide a shared, mobile infrastructure through which user devices 120 can communicate with the communications network while in transit. One such context is illustrated as one or more user devices 120 disposed in aircraft 130 (or other type of vehicle such as a bus, a train, an airplane, a cruise ship, etc.), where the mobile terminal 112 includes an on-board mobile communications infrastructure for communicating with the communications system 200a. For example, user devices 120 in such a context can be a passenger's portable media device (e.g., smart phone, tablet or laptop computer, etc.), an on-board terminal (e.g., a seatback entertainment system, a ceiling-mounted entertainment system, etc.), or any other type of end-user device that is integrated in, removably coupled with, or otherwise disposed in context of an aircraft 130; and the aircraft 130 can be in communication with the satellite communications system 200a via an on-board satellite antenna and modem (e.g., via an in-transport server 125 and/or other components that provide various communications-related functions, such as routing functions, storage functions, mobility-aware quality of service (QoS) functions described herein, etc.) and/or any other intermediary communications infrastructure.

As described above, user devices 120 can move through multiple spot beams 225, so that the user devices 120 can potentially be serviced by multiple spot beams 225 of the satellite communications system 200a over the course of a trip. Embodiments include a mobility management system 140 to facilitate providing a level of quality of service (QoS) to those user devices 120, even as they pass through beam service coverage areas that are more or less congested. As illustrated in FIG. 2A, the mobility management system 140 can be implemented as one or more computational platforms in communication with provider-side nodes of the satellite communications system 200a, such as directly or indirectly in communication with a gateway 110, core node, or any other suitable node of the provider-side communications infrastructure. Though not shown, the provider-side communications infrastructure can further be in communication (e.g., via one or more networks 160) with one or more content sources (e.g., content server 180 of FIG. 1), etc. Content requests for media content items from the content server 180 can originate from consumers (users) via their user devices 120, and can be relayed via consumer-side infrastructure (e.g., infrastructure of a mobile terminal 112, an in-transport server 125, aircraft 130, etc.) and the beam infrastructure (e.g., the satellite 105) to the provider-side infrastructure (e.g., satellite gateways 110, core nodes, etc.). At the provider-side infrastructure, the requests can be processed and optimized by the mobility management system 140, and the requests can be fulfilled with the requested media content items from one or more content servers 180.

Processing and optimizing of the content requests by the mobility management system 140 can exploit usage models and path awareness of the aircraft 130 and the user devices 120 disposed therein. For example, embodiments can identify one or more uncongested beams as preceding one or more congested beams along a predicted transport path of the aircraft 130. A prediction can be made as to future consumption by the user devices 120 of pre-positionable media content when the aircraft 130 is expected to be serviced by one of the subsequent congested beams. For example, if a user is presently streaming a movie via a user device 120, a prediction can be made as to whether portions of the movie are likely to be streaming when the user device 120 is later serviced by a congested beam. When such consumption for pre-positionable content is predicted, embodiments can schedule transmission of at least a portion of the pre-positionable content over one or more of the preceding uncongested beams for storage in a local data store in communication with the user device 120. In this way, the content can be pre-positioned at the user device 120 prior to the user device 120 being serviced by the congested beam.

In the illustrated embodiment, the mobility management system 140 includes a transport path modeler system 280, a congestion modeler system 270, a terminal usage modeler system 260, a mobility-aware scheduler system 250, and a pre-positioning system 263. Some embodiments may have different and/or additional systems than those shown in FIG. 2A. The functionality of each of the systems of the mobility management system 140 can implemented as one or more computational platforms. Although shown separately in FIG. 2A, in some embodiments some or all of the systems of the mobility management system 140 can be implemented as part of the same computational platform.

Embodiments of the transport path modeler system 280 can predict transport paths of user devices 120. In some embodiments, one or more user devices 120 can be associated at the mobility management system 140 with a particular aircraft 130 (e.g., when an user device 120 accesses communications services via the aircraft 130 infrastructure, it can automatically be associated therewith). Alternatively, the mobility management system 140 can communicate with the aircraft 130 infrastructure (e.g., the in-transport server 125 or other component of the onboard mobile terminal 112), and all the traffic from all the user devices 120 disposed in the aircraft 130 are seen as (or otherwise treated as) traffic associated with that aircraft 130. In such embodiments, the transport path of a user device 120 can be predicted as the transport path of its associated aircraft 130.

Embodiments of the transport path modeler system 280 can predict the transport path of the aircraft 130 in any suitable manner. In some embodiments, the transport path modeler system 280 obtains transport data 285 (e.g., from a public or restricted Internet-based service, or other source) that indicates path-related information for the aircraft 130, which can include planned, present, predicted, and/or other path-related information associated with a present trip. For example, planned information can include origin and destination locations (e.g., a "city pair," coordinates, airport identifiers, etc.) and planned travel path, altitude, speed, etc. over the trip. Present information can include present (or last-reported) location, altitude, speed, etc. Predicted information can include calculated predictions of path, location, altitude, speed, etc. according to present information, planned information, and/or any other impacting data (e.g., weather patterns, statistical data from previous instances of that or other trips, etc.). In some embodiments (e.g., where a user device 120 is not associated with an aircraft 130, or the aircraft 130 is not associated with any known trip information), the transport data 285 can be determined according to any suitable information, such as statistical information, sensor information (e.g., data received from global positioning satellite (GPS) sensors, altimeters, accelerometers, beam triangulation, etc.), etc.

Embodiments of the congestion modeler system 270 can compute a congestion map to indicate congestion conditions for multiple spot beams 225 of the satellite communications system 200a (e.g., or, more generally, for any multiple carriers of the multi-carrier communications system) along the predicted transport path. For example, the computed congestion map can indicate a congestion condition (e.g., congested or uncongested, amount of available capacity, etc.) for a spot beam 225 presently servicing the aircraft 130 and/or any number of other spot beams 225 along the predicted transport path. The congestion conditions of the spot beams 225 can be computed in any suitable manner. In some embodiments, the computation is based on congestion statistics, provisioning, and/or other macro-level data that does not necessarily account for actual present conditions. For example, based on historical statistics and/or allocations, embodiments can estimate levels of congestion for each of a number of spot beams 225 at each of a number of timeframes with some degree of certainty. Such estimates can be used to map congestion levels for spot beams 225 across some or all of the predicted transport path, for example, accounting for when (during which timeframe(s)) the aircraft 130 is expected to be in the service coverage area of each particular spot beam 225. In other embodiments, the computation of congestion is based on actual feedback information from the network. For example, various techniques may be used for testing present throughput, data rate, or other link conditions, which can directly or indirectly indicate a present congestion level. In effect, embodiments of the congestion modeler system 270 can apply various usage predictions (models, etc.) to data indicating present demand and/or capacity 255 for one or more spot beams 225 to derive predictions for upcoming demand and/or capacity 265 of one or more spot beams 225. In some embodiments, the predicted demand and/or capacity 265 can also account for known upcoming demand, such as scheduled communications, etc.

As described above, predicted transport path information can indicate where the aircraft 130 is likely to be at what times. Mapping that data to service coverage areas of the spot beams 225 can effectively indicate "service timeframes," or timeframes during which the aircraft 130 is likely to be serviced by each beam along its predicted transport path. Further accounting for the congestion map data, a mobility-aware congestion model 275 can be formulated to indicate a likely congestion condition for each spot beam 225 (e.g., some or all spot beams 225) along the predicted transport path during a respective service timeframe for that spot beam 225 (i.e., will the spot beam 225 be congested during the time it is expected to service the transport craft 130). As used herein, the mobility-aware congestion model 275 can effectively be an enhanced embodiment of the congestion map.

Embodiments described herein can operate in conditions where the congestion map (or the mobility-aware congestion model 275) shows at least one uncongested spot beam 225 preceding at least one congested spot beam 225 along the predicted transport path (e.g., accounting for service timeframes). In particular, the computed congestion map indicates that there is at least a first spot beam 225 (e.g., the beam presently servicing a particular user device 120 or some subsequent spot beam 225 along the predicted transport path) that is indicated by the congestion map as uncongested with respect to servicing the user devices 120 onboard the aircraft 130, and that there is at least a second spot beam 225 (subsequent to the first spot beam 225 along the predicted transport path) indicated by the congestion map as congested with respect to servicing the user devices 120 onboard the aircraft 130. In some examples in the description herein, the pre-positioning techniques are described with respect to a single uncongested beam and a single congested beam. More generally, the techniques described herein are applicable to one or more uncongested beams and one or more congested beams along the predicted transport craft of the aircraft.

Embodiments of the pre-positioning system 263 can, based on the content media items that are presently provided from one or more content sources (e.g., content server 180) to the user devices 120 within the aircraft 130, identify candidate media content portions for consumption by the user devices 120 when the aircraft 130 will be serviced by the second spot beam 225 (i.e., during a service timeframe determined for the second spot beam 225). A candidate media content portion is media content that may be consumed by one or more user devices 120 onboard the aircraft 130 during the service timeframe determined for the second spot beam 225, given the current consumption of the presently provided media content item.

The pre-positioning system 263 can identify, or otherwise become aware of, the presently provided content media items in any suitable manner. For example, the pre-positioning system 263 may obtain information (e.g., metadata) indicating the presently provided media content items from the content server 180, from the user devices 120, from the mobile terminal 112, other systems of the mobility management system 140, and/or other components of the satellite communications system 200a. The pre-positioning system 263 may also obtain information (e.g., metadata such as a timestamp) indicating the individual current positions within the provided content media items at which they are presently being streamed to the user devices 120. For example, the pre-positioning system 263 may receive such information from the content server 180 in response to a request. Alternatively, other techniques may be used to obtain this information.

The pre-positioning system 263 can identify the candidate content portions in any suitable manner. The candidate media content portions may for example be streaming media content available from the same content source (e.g., content server 180) as the presently provided media content items. In some embodiments, the identifying is done by matching the presently provided media content item to pre-determined associated media content. The candidate media content portions of the associated media content can then be identified using the current position of the presently provided content media item and information about the predicted transport path of the aircraft 130 (e.g., the amount of time until the aircraft 130 is expected to be serviced by the second spot beam 225, the length of the service timeframe of the second spot beam 225, etc.).

A candidate media content portion may be a subsequent portion to the current position of the presently provided content media item, or may be a portion of a different content item than the provided content media item. As used herein, a "portion" may include some or all of a particular content media item. As one example, a user can be presently streaming a movie via the user device 120 and, based on the time remaining on the movie, is expected still to be streaming the movie during the service timeframe of the second spot beam 225. In such a case, the candidate media content portion can be the portion of the movie expected to be consumed during the service timeframe of the second spot beam 225. As another example, some media is episodic (e.g., episodes of a television program, podcast, etc.), and consumption of one episode can indicate a high likelihood of subsequent consumption for associated (e.g., subsequent) episodes of the series. Thus, a user can be presently streaming a given episode of the series via the user device 120 and, based on the time remaining on the given episode, is expected to finish the given episode before the service timeframe of the second spot beam 225. In such a case, the candidate media content portion can be the portion of the next episode expected to be consumed during the service timeframe of the second spot beam 225. As yet another example, some groups of media content items can be determined (e.g., manually, by machine learning, etc.) to be highly related, such that consumption of one of the media content item can indicate a high likelihood of subsequent consumption of other media content items in the group. Thus, a user can be presently streaming a first media content item of the group and, based on the remaining time of the given media content item, is expected to be streaming a second media content item in the group during the service timeframe of the second spot beam 225. In such a case, the candidate media content can be the portion of the second media content item expected to be consumed during the service timeframe of the second spot beam 225.

The media content associated with the presently provided media content item may be determined in any suitable manner. In some embodiments, the association can be based at least in part on prior user consumption that followed consumption of the presently provided content item. The prior user consumption may be for all users of the content server 180, or a subset. The prior user consumption can be determined by analyzing consumption history patterns stored in log files or other data structures. For example, the association can be based on a frequency at which the associated content was consumed following consumption of the presently provided media content item. In such a case, consumption that occurred more than a certain time period after consumption of the presently provided media content item may be excluded.

In some embodiments, the association can be based on prior user consumption associated with mobile terminals 112. Users associated with mobile terminals 112 may have different consumption patterns than users associated with fixed terminals. For example, users associated with mobile terminals 112 may be more likely to consume certain types of media content items than users associated with fixed terminals.

In some embodiments, the association can be user-specific. For example, the association may be based on a request queue associated with the user of the user device 120 that is consuming the presently provided media content item (e.g., a queue maintained by a third-party streaming service, a user-provided list of content desired for consumption during the flight, etc.).

The association can also or alternatively be based on other factors related to the particular aircraft 130 such as flight duration, city pair, time of year (seasonality), time of day, and/or other factors related to the media content such as content release schedules, popularity of content, etc.

In some embodiments, the pre-positioning system 263 calculates, or otherwise obtains, individual pre-position scores for the candidate media content portions. The individual pre-position scores can be calculated using one or more factors, including for example based on one or more factors described above for associating with presently provided content item. An individual pre-position score of a given candidate media content portion can indicate a likelihood (or probability) that the given candidate media content portion will be consumed during the service timeframe of the second spot beam 225. In other words, the individual pre-position score can indicate the conditional probability of consumption of the given candidate media content portion following consumption at the current position at the presently provided content item. The pre-position score can for example depend at least in part where the current position is within the presently provided content item. For example, a user that is currently 60 minutes into a movie can have a higher likelihood of still streaming the movie for the time period from 15-30 minutes in the future, than a user that is currently 3 minutes into the movie. In such a case, the pre-position score when 60 minutes into the movie can be higher than when 3 minutes into the movie. In some embodiments, the pre-position score can be based in part on whether the given candidate media content portion can be multi-cast to other opportunistic terminals within the second spot beam 225 during the second service timeframe. For example, the given candidate media content portion may have a higher pre-position score if it can be multi-cast.

The presently provided media content item may for example be compared against a stored lookup table, or any suitable data structure, to determine one or more candidate content portions for the presently provided content media item. The data structure may be maintained by the content server 180, the pre-positioning system 263, or other component of the satellite communication system 200*a*. The storage data structure can associate the presently provided media content item with itself (e.g., since subsequent portions of the presently provided content media item may be consumed during service by the second spot beam 225). The storage data structure can also associate the presently provided media content item with one or more additional media content items that may be likely to be consumed following the presently provided media content item.

The pre-positioning system 263 may identify the candidate media content portions to account for uncertainties related to the service timeframe of the second spot beam 225 due to uncertainty in travel speed, changes in transport schedules, and/or any other suitable factors. For example, a user may be presently streaming a movie and be expected to be streaming the 1:30 to 1:45 portion of the movie during the service timeframe of the second spot beam 225. Because of service time frame uncertainty, the candidate media content portion identified for the movie may be different than the 1:30 to 1:45 portion of the movie, such as including some of the movie before the 1:30 position and/or including some of the movie after the 1:45 portion.

The number of candidate media content portions that are identified for each currently provided content media item can vary from embodiment to embodiment. In some embodiments, a single candidate media content portion is identified for each currently provided content media item. In other embodiments, one or more candidate media content portions can be identified for each presently provided content media item. For example, if a given currently provided content media item is expected to complete streaming during the service timeframe of the second spot beam 225, a first candidate media content portion can be the end portion of the given presently provided media content item expected to be streamed during the service timeframe of the second spot beam 225, and a second candidate media content portion can be the beginning portion of another media content item predicted to be consumed after the given presently provided media content item. In yet other embodiments, the number of candidate media content portions may vary and be different among the currently provided content media items.

Embodiments of the terminal usage modeler system 260 can then select a set of media content portions from the candidate media content portions for pre-positioning prior to the service timeframe of the second beam 225. As described in more detail below, the terminal usage modeler system 260 can select the set from the candidate media content portions that satisfy a pre-position threshold that is based on one or more factors that can vary from embodiment to embodiment. By using the pre-position threshold, the candidate media content portions most likely to be consumed can be pre-positioned using available resources, while the candidate media content portions that may be less likely to be consumed are not.

The pre-position threshold can vary from embodiment to embodiment and can change dynamically. In some embodiments, the pre-position threshold can be based at least in part on the available capacity of the first spot beam 225. In such a case, the pre-position threshold may be inversely proportional to the available capacity, so that more candidate media content portions are selected for the set when more capacity if available to use for pre-positioning. The available capacity may be based on the capacity of the first spot beam 225 available for communications with the aircraft 130 (or the user devices 120 onboard the aircraft 130 collectively or individually) during the first service timeframe of the first spot beam 225. The available capacity for the aircraft 130 may for example be based on the difference between the expected entire amount of data to be communicated via the first spot beam 225 and the amount of data the first spot beam 225 is capable of communicating during the first service timeframe, or some offset thereof. Alternatively, the available capacity may be different than this. For example, the available capacity may be the available portion of the capacity of the first spot beam 225 that was allocated for a particular purpose, such as a particular type of traffic, a particular type of terminal, and/or for each individual aircraft 130 or user device 120. In embodiments in which there are multiple uncongested spot beams 225 preceding the second spot beam 225, the pre-position threshold may be based on the available capacity of each of the preceding uncongested spot beams 225.

Additional or alternative factors may also be used to determine the pre-position threshold. In some embodiments, the pre-position threshold can be based at least in part on the length of time until the second service timeframe of the second spot beam is expected to begin. In such a case, the pre-position threshold can be inversely proportional to this length of time, to reflect the possible lower likelihood of consumption the further out in time the consumption will be.

In some embodiments in which the first spot beam 225 is presently servicing the aircraft 130, the pre-position threshold may be based at least in part on the length of time remaining of the first service timeframe of the first spot beam 225.

In some embodiments, the pre-position threshold may be based at least in part on the expected level of congestion of the second spot beam 225 during the second service timeframe. In such a case, the pre-position threshold may be inversely proportional to the expected level of congestion, so that more candidate media content portions are selected for the set for higher expected levels of congestion of the second spot beam 225.

In some embodiments, the pre-position threshold may be based at least in part on a length of time of the second service timeframe of the second spot beam 225. In such a case, the pre-position threshold may be inversely proportional to this length of time, to account for the longer time the aircraft 130 will be serviced under congestion.

In some embodiments, the pre-position threshold may be based at least in part on available capacity of one or more spot beams subsequent to the second spot beam 225 along the predicted transport path.

In some embodiments, the pre-position threshold may be based at least in part on available storage space within the terminal cache 127 local to the aircraft 130. In such a case, the pre-position threshold may inversely proportional to the available storage space, so that more candidate media content portions are selected for the set when more storage space is available in the terminal cache 127.

The set of media content portions can be a subset of the candidate media content portions. In other words, the number of media content portions selected to include in the set may be less than the number candidate media content portions. For example, the number of candidate media content portions may be twenty (as an example), while the number of media content portions within the set is less than twenty.

A selected media content portion within the set may correspond to a shortened segment of the corresponding candidate media content portion. In other words, the time period of the selected media content portion may be less than the time period of the corresponding candidate media content portion. In such a case, the selected media content portion can be the beginning segment, which is more likely to be consumed than a later segment since it is earlier in time. For example, the selected media content portion may be the first ten minute segment of the candidate media content portion that is 20 minutes long.

A selected media content portion within the set may correspond to a lengthened segment of the corresponding candidate media content portion. In other words, the time period of the selected media content may be longer than the time period of the corresponding candidate media content portion.

In embodiments in which pre-position scores (discussed above) are obtained for the candidate media content portions, the pre-position threshold may correspond to a threshold pre-position score. In such a case, the terminal usage modeler system 260 can select some or all of the candidate media content portions having pre-position scores exceeding the threshold pre-position score. In some embodiments, the terminal usage modeler system 260 selects a pre-determined number of the candidate media content portions having the highest individual pre-position scores. For example, the terminal usage modeler system 260 may create a ranked list of the candidate media content portions using the individual pre-position scores, and then select the pre-determined number that are highest on the list.

Having determined that at least one uncongested spot beam 225 (a first spot beam 225) will precede at least one congested spot beam 225 (a second spot beam 225), and having determined that the user devices 120 onboard the aircraft 130 are likely to consume the selected set of media content portions during the service timeframe of the congested spot beam 225, it can be desirable to pre-fulfill the upcoming consumption using available capacity on the uncongested spot beam 225. Embodiments of the mobility-aware scheduler system 250 can schedule transmission via the first spot beam 225 of at least a portion of the selected set of media content portions for storage local to the terminal cache 127.

The scheduling can be implemented by the mobility-aware scheduler system 250 in a manner suitable to the location of the mobility-aware scheduler system 250 and the type of communications system. In some embodiments, the mobility-aware scheduler system 250 can communicate with the provider-side infrastructure of the communications system to allocate communications resources (e.g., allocate bandwidth in the first beam 225, etc.), establish a logical communications path with an appropriate content server 180, request some or all of the selected set of media content portions (e.g., communicate a proxy request for the content on behalf of the user device 120), and transmit the received media content portions to the terminal cache 127.

At some subsequent time, when the aircraft 130 is being serviced by a congested spot beam 225, and the user device 120 ultimately makes its upcoming (implied or explicit) request, the request can be fulfilled locally by retrieving the appropriate content media portion from the terminal cache 127. In this way, the user device 120 can continue to consume the content item without relying on receiving the content in real time, which may be difficult (e.g., technically challenging, resource intensive, etc.) to do from the congested spot beam 225. Any suitable technique can be used for redirecting the user device 120 to request the content from the terminal cache 127 instead of from the congested spot beam 225. In one embodiment, the user device 120 (or the in-transport server 125) can intercept content requests (e.g., as a proxy, etc.), determine whether the requested content is available locally, and cause the request to be redirected automatically (e.g., regardless of the congestion level of the servicing spot beam 225 at the time of the request).

Some embodiments invoke the pre-positioning functionality in response to determining availability on the present spot beam 225 (i.e., the spot beam 225 presently servicing the user device 120). For example, present capacity is monitored to detect when a certain amount of capacity is presently available, in response to which the mobility management system 140 can trigger some or all of the computations, determinations, etc. involved in pre-fulfilling an upcoming consumption. In such cases, the congestion map may consider the present spot beam 225 and one or more upcoming congested spot beams 225 (e.g., the spot beam 225 likely to be encountered next in the transport path, or any one or more subsequent beams). Other embodiments invoke the pre-positioning functionality in response to determining congestion on an upcoming spot beam 225 (e.g., a next spot beam 225 or any predicted future spot beam 225 along the transport path). For example, a congestion map can be consulted, dynamically updated, etc. to detect a future congestion condition, in response to which a determination can be made as to whether there will be capacity available on a preceding spot beam 225 (e.g., the present or other preceding spot beam 225), which can trigger the mobility management system 140 to perform some or all of the computations, determinations, etc. involved in pre-fulfilling an upcoming consumption. Embodiments can also account for congestion maps that include any number of spot beams 225, and can optimize how and when to pre-position content, accordingly. Suppose, for example, a small amount of capacity is available on the present spot beam 225 (Beam A), a large amount of capacity is available on the next spot beam 225 (Beam B), and a third spot beam 225 is congested (Beam C). It may be more optimal (or otherwise desirable) to schedule the pre-positionable content for delivery over Beam B instead of over Beam A, or to pre-position a first portion of the content over Beam A and a second portion over Beam B, etc.

Figure 2B:
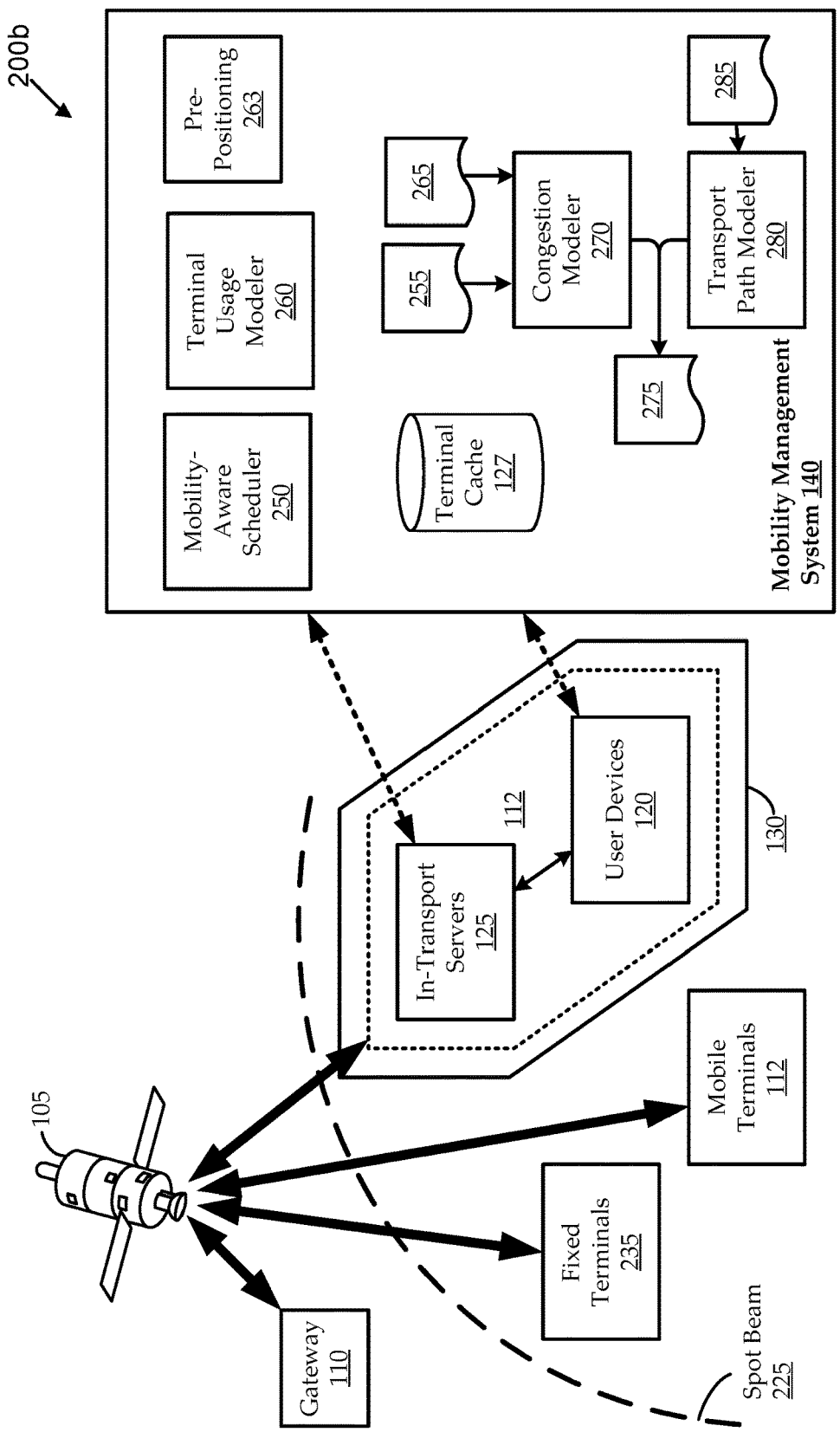

FIG. 2B shows a simplified diagram of another multi-beam satellite communications system 200b, which provides a context for various embodiments. The satellite communications system 200b can be an embodiment of the communications system 100 described with reference to FIG. 1 or any other suitable multi-beam (e.g., multi-carrier) communications system. The illustrated satellite communications system 200b is similar to the satellite communication system 200a of FIG. 2A, except that the mobility management system 140 is implemented in consumer-side infrastructures. For example, each of a number of aircraft 130 can have a respective instance of the mobility management system 140 implemented as part of (or in communication with) its in-transport server 125. In such embodiments, content requests can originate from consumers (users) via their user devices 120, and can be received (e.g., intercepted, etc.) by the mobility management system 140 implemented at the aircraft 130 where the user device 120 is disposed. The mobility management system 140 on the aircraft 130 can process and optimize the request, which can include communicating information in association with the request over the beam infrastructure (e.g., the satellite 105) to the provider-side infrastructure (e.g., satellite gateways 110, core nodes, etc.) for fulfillment with requested content from one or more content sources (e.g., content server 180, etc.).

The particular embodiments illustrated in FIGS. 2A and 2B are not intended to limit other possible embodiments. For example, some embodiments can distribute portions of the mobility management system 140 between provider-side and consumer-side infrastructures. According to one such embodiment, content requests from various user devices 120 can be received (e.g., intercepted, etc.) and processed by respective transport craft-side instances of mobility-aware scheduler systems 250, terminal usage modeler systems 260, and/or other portions of the mobility management system 140 implemented at the aircrafts 130 where the user devices 120 are disposed. One or more provider-side management systems 140 can then process the requests (e.g., per aircraft 130, aggregated across multiple aircrafts 130, etc.) to optimize fulfillment of the requests with requested content from one or more content sources based on the respective transport data 285 of the aircrafts 130 and/or other information.

Different embodiments of the mobility management system 140 can facilitate different types of functionality. For example, the location of the mobility management system 140 can impact which computation techniques are available and/or used by the congestion modeler system 270. For the sake of illustration, implementing the congestion modeler system 270 at the provider side of the communications system can help facilitate the congestion modeler system 270 obtaining data from multiple spot beams 225 for use in computing the congestion maps, etc. For embodiments in which the congestion modeler system 270 is on the aircraft 130, the congestion modeler system 270 can determine congestion on its own (e.g., by measuring throughput, performing speed tests, etc.), by using stored information (e.g., historical congestion data, etc.), by querying the provider-side infrastructure (e.g., by requesting actual, statistical, and/or other data from the gateway 110 or other provider-side nodes), or in other suitable manners.

Figure 3:
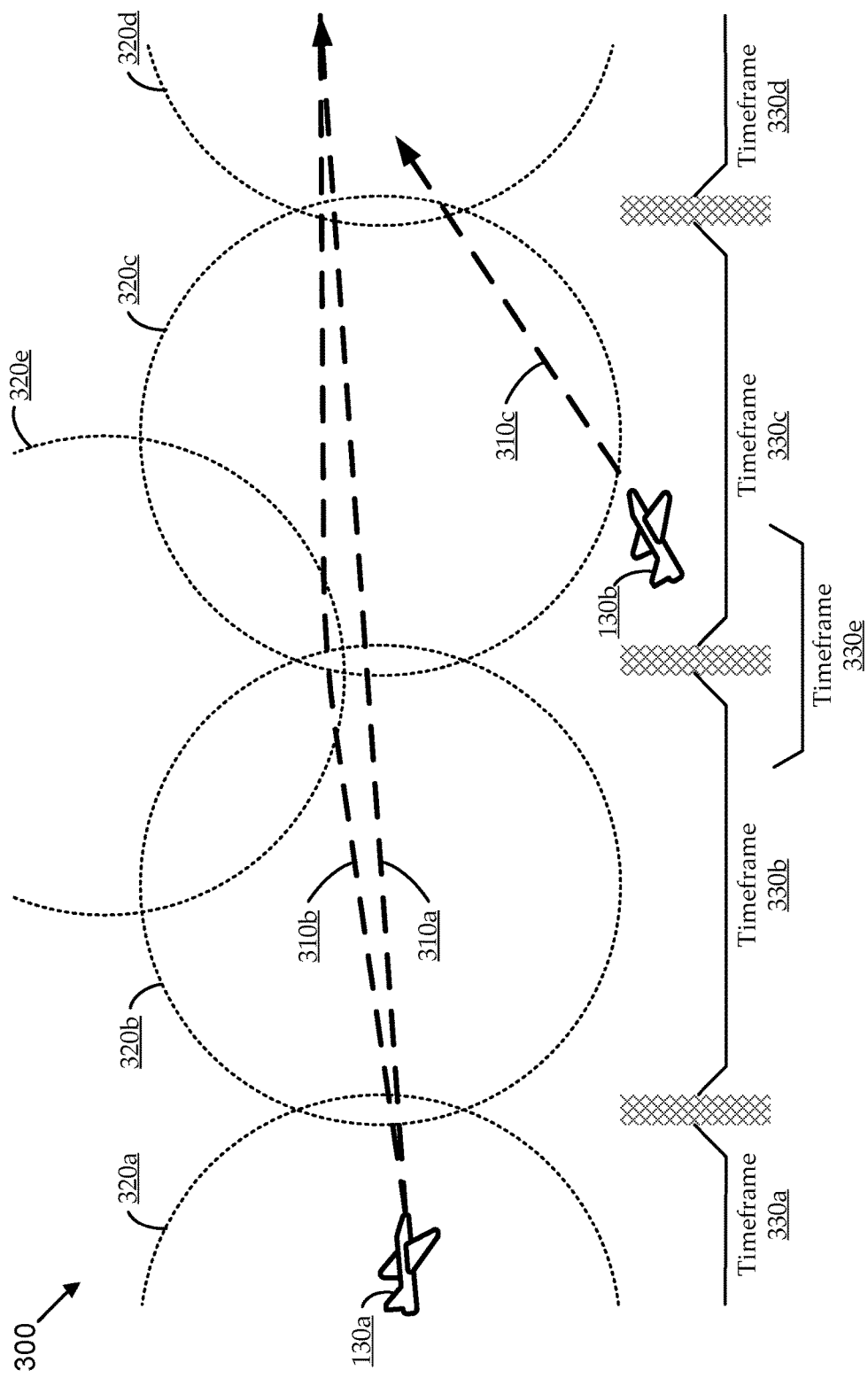
FIG. 3 shows an example of transport crafts traveling along transport paths through a number of beam coverage areas over a number of timeframes.

FIG. 3 shows an example of multiple aircraft 130 traveling along transport paths 310 through a number of beam coverage areas 320 over a number of timeframes 330. For example, FIG. 3 can be a graphical representation of a congestion map (e.g., a mobility-aware congestion map 275). As illustrated, the multiple aircraft 130 can be airplanes flying through a number of spot beam coverage areas over the course of individual predicted flight paths. The example demonstrates certain features and functionality that can arise in certain instances. For example, based on various data, there may be some uncertainty in the flight path prediction, such that one of the airplanes (aircraft 130a) may follow a path more like transport path 310a or more like transport path 310b. Both transport paths 310 place the aircraft 130a in a first beam coverage area 320a during a first timeframe 330a, in a second beam coverage area 320b during a second timeframe 330b, in a third beam coverage area 320c during a third timeframe 330c, and in a fourth beam coverage area 320d during a fourth timeframe 330d. According to transport path 310b, there is a certain timeframe 330e during which the transport craft 130a may be serviced by beam coverage area 320e. Accordingly, some embodiments can optimize QoS provision to user devices 120 on the aircraft 130a (e.g., pre-fulfillment of upcoming consumption by those user devices 120) in a manner that accounts for the transport path 310 uncertainty (e.g., by discounting timeframe 330e in pre-positioning determinations).

The example further demonstrates that boundaries of and between the beam coverage areas 320 may not be perfectly defined. For example, beam coverage areas 320 can overlap, and/or performance may decrease (e.g., there may be lower effective throughput due to various factors) near the edge of a beam coverage area 320 as compared to the center or particular regions within a beam coverage area 320. Accordingly, some embodiments can optimize QoS provision to user devices 120 on the aircraft 130 in a manner that accounts for the boundary uncertainties in beam coverage areas 320 (e.g., by considering service timeframes only as a portion of the time during which an user device 120 is likely to be serviced by a particular beam).

Additional optimizations can account for uncertainties in travel speed, changes in transport schedules, and/or any other suitable factors. For example, referring to FIGS. 2A and 2B, embodiments can monitor air traffic control data, public transportation location and/or traffic data, and/or other types of path-related information (e.g., transport data 285 described above) to dynamically (or periodically, etc.) update transport path 310 predictions. Some embodiments can also monitor present demand and/or capacity 255, predicted demand and/or capacity 265, and/or other congestion-related data to dynamically update congestion maps. These updates can be based on information relating to a particular user device 120, groups of user devices 120 (e.g., all user devices 120 in a particular transport craft 130 or communicating via a particular in-transport server 125), and/or any other single or multiple terminals.

Some embodiments can monitor many aircraft 130 (e.g., all commercial flights) to de-conflict and/or otherwise optimize pre-fulfillment of consumption among multiple user devices 120. For example, aircraft 130a and aircraft 130b are both expected to be in the third beam coverage area 320c during at least some of the third timeframe 330c (as illustrated by the transport path 310c of transport craft 130b). Further, each transport craft 130 can have multiple user devices 120 disposed thereon. In such an environment, there may be instances where multiple, concurrent opportunities arise for pre-fulfilling upcoming requests associated with multiple user devices 120 and/or multiple transport crafts 130. There may not be enough available capacity on an uncongested beam to pre-fulfill all those upcoming requests before reaching a congested beam, so that some embodiments can attempt to determine how best to pre-fulfill the multiple upcoming requests. Some embodiments can handle those opportunities in order of receipt. For example, traffic is analyzed in order of receiving requests for content, by querying terminal in a round-robin fashion, or in some other way that effectively orders receipt of requests. The requests, then, can be pre-fulfilled in order until no available capacity remains (e.g., until the previously uncongested beam becomes congested). Other embodiments can prioritize requests in any suitable manner, for example, by type of traffic, by availability of compression, by size of request, by class of requester (e.g., the requester has paid for premium service, is a first class passenger, etc.), etc. Again, the requests can be pre-fulfilled until capacity is no longer available. Other embodiments can determine whether it is more optimal to pre-fulfill larger portions of smaller numbers requests versus smaller portions of larger numbers of requests. In any of these or other embodiments, the optimization and de-conflicting can be performed in accordance with predetermined optimization criteria (e.g., minimization functions, etc.). For example, some embodiments can attempt to maximize consumption experience across all consumers, while other embodiments can attempt to maximize consumption experience for priority consumers and/or priority types of traffic (e.g., even at the expense of other consumers or traffic types).

FIGS. 4A-4E show various examples of congestion map representations 400 to further illustrate certain functionality in accordance with various embodiments. In each Figure, the congestion map representation 400 shows a transport path 310 over time as passing through a sequence of beam coverage areas 320 (each transport path 310 arrow is shown below the sequence of beam coverage areas 320 it passes through to avoid obscuring the congestion map representations 400). Each beam coverage area 320 is shown either as an uncongested beam coverage area 320 (indicated as unshaded with a "U") or as a congested beam coverage area 320 (indicated as shaded with a "C"). Each congestion map representation 400 also indicates a present location 410 of a aircraft 130 (or of an user device 120). The present location 410 can represent the location of the transport craft 130 at the time when a pre-fulfillment determination (e.g., computation of the congestion map, prediction of an upcoming request, etc.) is made.

Figure 4A:
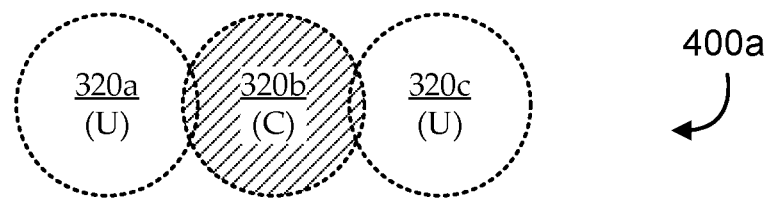
FIGS. 4A-4E show various examples of congestion map representations to further illustrate certain functionality in accordance with various embodiments.

Turning to FIG. 4A, the congestion map representation 400a shows the transport path 310 passing through three beam coverage areas 320 in a "U-C-U" sequence (i.e., the present beam is uncongested, and is followed by a congested beam, then another uncongested beam). In such a scenario, embodiments may determine that pre-positionable content is likely to be consumed by an user device 120 associated with the transport craft 130 during a service timeframe associated with the second (congested) beam coverage area 320b. In one variant, some or all of the pre-positionable content can be pre-positioned for delivery during the service timeframe associated with the first beam coverage area 320a. In another variant, a determination can be made that a first portion of the upcoming requests will likely be desired for consumption during the service timeframe associated with the second beam coverage area 320b, and a second portion of the upcoming requests will likely be desired for consumption only later (e.g., during the service timeframe associated with the third beam coverage area 320b); and the pre-positioning can be scheduled in accordance with the first portion of the upcoming requests. For example, suppose a consumer requests to begin streaming a two-hour movie at the present location 410; and the transport craft 130 is likely to be in the present beam coverage area 320a for another 30 minutes, in the second beam coverage area 320b for about an hour (i.e., during approximately the 0:30 to 1:30 portion of the movie), and in the third beam coverage area 320c subsequently (i.e., during approximately the 1:30 to 2:00 portion of the movie). One embodiment can attempt to pre-position as much of the movie as possible (i.e., from 0:00 to 2:00) in the next 30 minutes (while still in the present beam coverage area 320a). Another embodiment can attempt pre-position as much as possible of the portion of the movie likely to be serviced after leaving the present beam coverage area 320a (i.e., from 0:30 to 2:00). Another embodiment can attempt pre-position as much as possible of the portion of the movie likely to be serviced while in the second beam coverage area 320b (i.e., from 0:30 to 1:30). As described above, other embodiments can pre-position more or less of the content to account for various types of uncertainties. For example, one embodiment can attempt pre-position the portion of the movie from 0:20 to 1:40, to account for changes in transport path 310 (e.g., changes in speed can impact the time the transport craft 130 actually spends in each beam coverage area 320), uncertainties in beam coverage area 320 boundaries, etc. As described above, in some embodiments, the amount of pre-positioned content can depend on a number of additional factors, such as amount of available capacity (e.g., there may only be enough capacity available to pre-position a portion of the content, or the pre-positioning may only be allowed at all when enough capacity is available), conflicts with other requests (e.g., where the system attempts to maintain QoS for many terminals with potentially conflicting demands), etc.

Figure 4B:
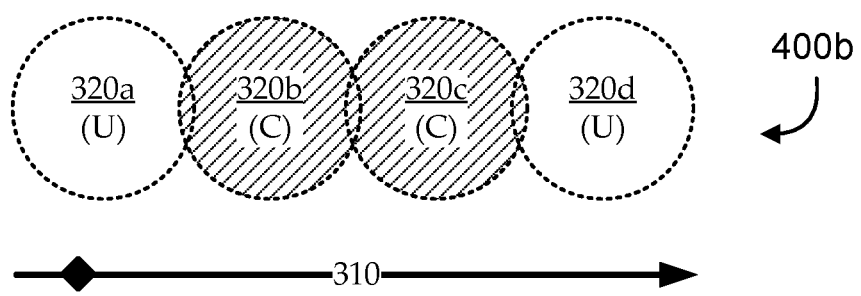

Turning to FIG. 4B, the congestion map representation 400b shows the transport path 310 passing through four beam coverage areas 320 in a "U-C-C-U" sequence (i.e., the present beam is uncongested, and is followed by two congested beams, then another uncongested beam). In such a scenario, the considerations can be similar to those discussed above with reference to FIG. 4A. The two adjacent congested beam coverage areas 320 can be considered as one larger congested beam coverage area 320, or separately (e.g., where there are different levels of congestion being considered, where considering the additional beam coverage area 320 adds appreciable uncertainty, etc.). For example, referring to the movie streaming example above, one embodiment can attempt to pre-position as much as possible of the portion of the movie likely to be serviced only while in the second beam coverage area 320b (i.e., from 0:30 to 1:30), effectively not considering the subsequent congested beam; while another embodiment can attempt to pre-position as much as possible of the portion of the movie likely to be serviced while in both the second and third beam coverage areas 320b, 320c (i.e., from 0:30 to 2:00).

Figure 4C:
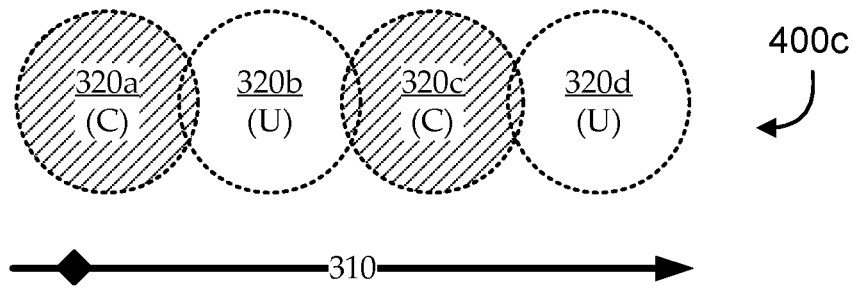

Turning to FIG. 4C, the congestion map representation 400c shows the transport path 310 passing through four beam coverage areas 320 in a "C-U-C-U" sequence. In this scenario, the present beam is congested, but it is followed by a "U-C-U" sequence, like the one described in FIG. 4A. One embodiment can wait until the transport craft 130 reaches the second (first uncongested) beam coverage area 320b, at which time it can re-evaluate (e.g., re-compute) the congestion conditions of the beams. Other embodiments can proceed to schedule pre-positionable requests predicted to be serviced in the third (congested) beam coverage area 320c for delivery to (and storage at) the transport craft 130 while it is in the second (uncongested) beam coverage area 320b.

Figure 4D:
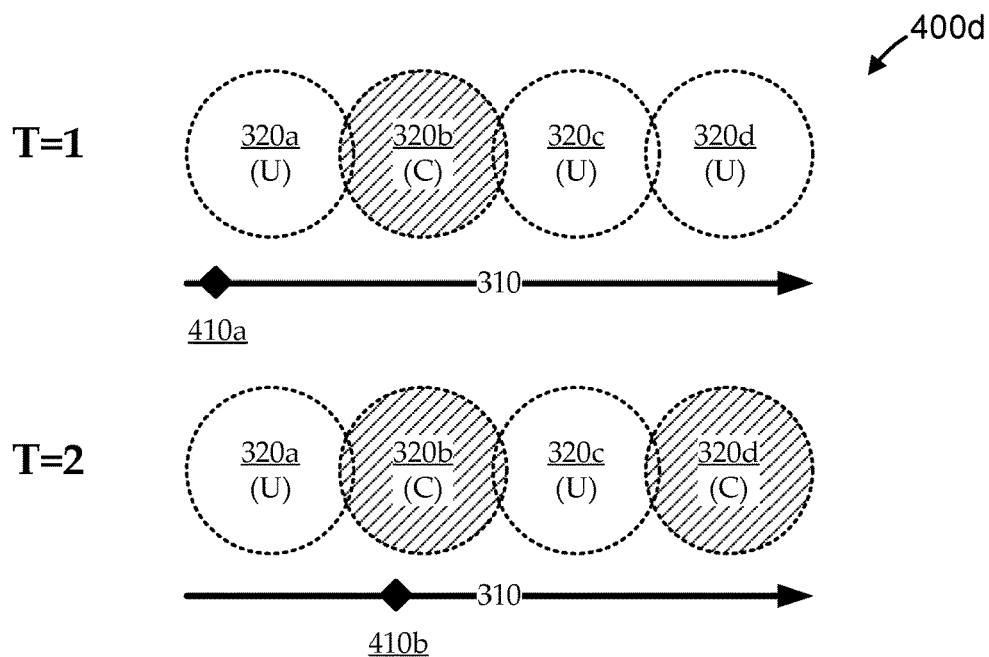

Turning to FIG. 4D, the congestion map representation 400d shows the transport path 310 passing through four beam coverage areas 320, as computed when the transport craft 130 is in a first present location 410a (i.e., at time T=1) and when the transport craft 130 is in a second present location 410b (i.e., at time T=2). At time T=1 (e.g., when a first request is made), the congestion map indicates a "U-C-U-U" sequence, which can effectively be the same as the scenario discussed with reference to FIG. 4A. At time T=2 (e.g., when a second request is made), the congestion map indicates a "U-C-U-C" sequence. Since the transport craft 130 is already in the second beam coverage area 320b, this is effectively a "C-U-C" sequence, which can be considered as similar or identical to the scenario discussed with reference to FIG. 4C. The scenarios in FIG. 4D can illustrate additional complexity in the event that the upcoming request predictions look forward to all four beam coverage areas 320. For example, adapting the streaming movie example above, suppose the requested movie is two hours long, and the transport craft 130 is predicted to be in each of the four beam coverage areas 320 for thirty minutes. Based on the congestion map computed at time T=1, embodiments may only pre-position content (i.e., from 0:30 to 1:00) predicted to be consumed while the transport path is in the second beam coverage area 320b (e.g., the only congested beam). However, when the congestion map is recomputed at time T=2, a further determination can be made to schedule the last thirty minutes (i.e., from 1:30 to 2:00, predicted to be consumed while in congested beam coverage area 320d) when the transport craft 130 is in beam coverage area 320c. At the same time (at time T=2), the system may be evaluating a second request, which may have to be de-conflicted with respect to pre-fulfilling remaining first-request content.

Figure 4E:
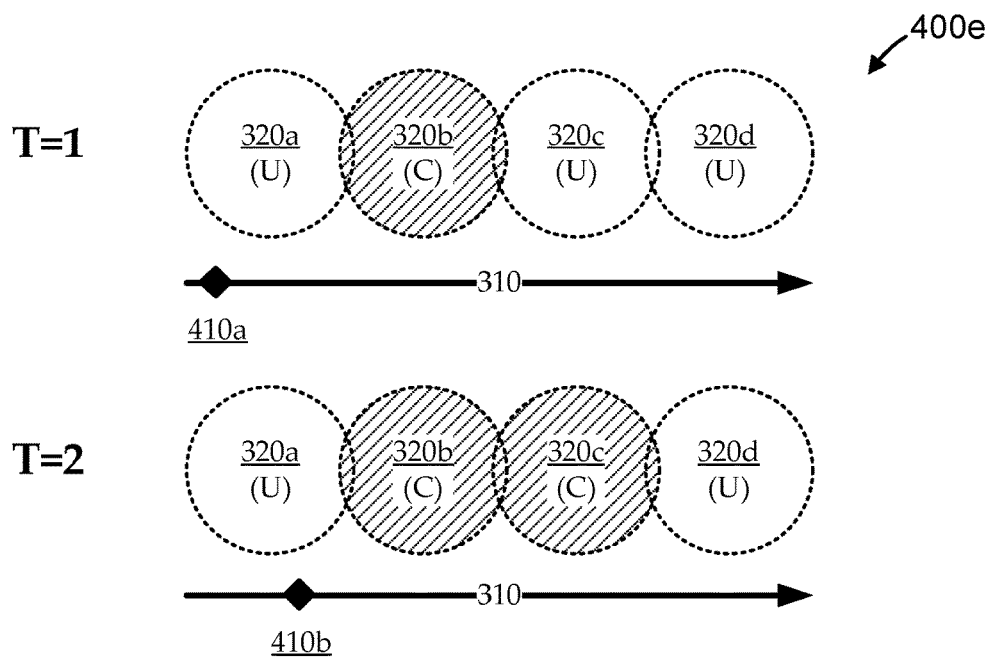

Turning finally to FIG. 4E, the congestion map representation 400e shows the transport path 310 passing through four beam coverage areas 320, as computed when the transport craft 130 is in a first present location 410a (i.e., at time T=1) and when the transport craft 130 is in a second present location 410b (i.e., at time T=2). At time T=1 (e.g., when a first request is made), the congestion map indicates a "U-C-U-U" sequence, which can effectively be the same as the scenario discussed with reference to FIG. 4A. At time T=2 (e.g., when a second request is made), the congestion map indicates a "U-C-C-U" sequence. While the T=2 congestion map looks similar to the one in FIG. 4B, the transport craft 130 at T=2 is already almost in beam coverage area 320b, leaving little time to pre-position additional content. For example, with respect to the first request received at T=1, the updated congestion map at T=2 may indicate that an insufficient amount of content was pre-positioned to get through the next two beam coverage areas 320b, 320c; and additional pre-positioning may or may not be possible (e.g., depending on the time remaining in the present beam coverage area 320a, the amount of available capacity, etc.). Further, for the second request made at T=2, the system can consider the transport craft 130 as still in beam coverage area 320a (so that there may or may not be enough time to perform a useful amount of pre-positioning), consider the transport craft 130 as if it were already in beam coverage area 320b (so that no pre-positioning is invoked), etc.

The various congestion map representations 400 in FIGS. 4A-4E are intended as only illustrative of certain types of scenarios, and are not intended to represent all scenarios. One additional type of scenario has multiple uncongested beams (e.g., adjacent to each other or not) preceding one or more congested beam. In such a scenario, some embodiments can spread pre-positioning across those uncongested beams. For example, if it was determined to pre-position twenty minutes of content, a portion of the pre-positionable content can be scheduled for delivery over each of multiple beams when the transport craft 130 is in those respective beam coverage areas 320 (e.g., ten minutes in each of two uncongested beams).

Figure 5:
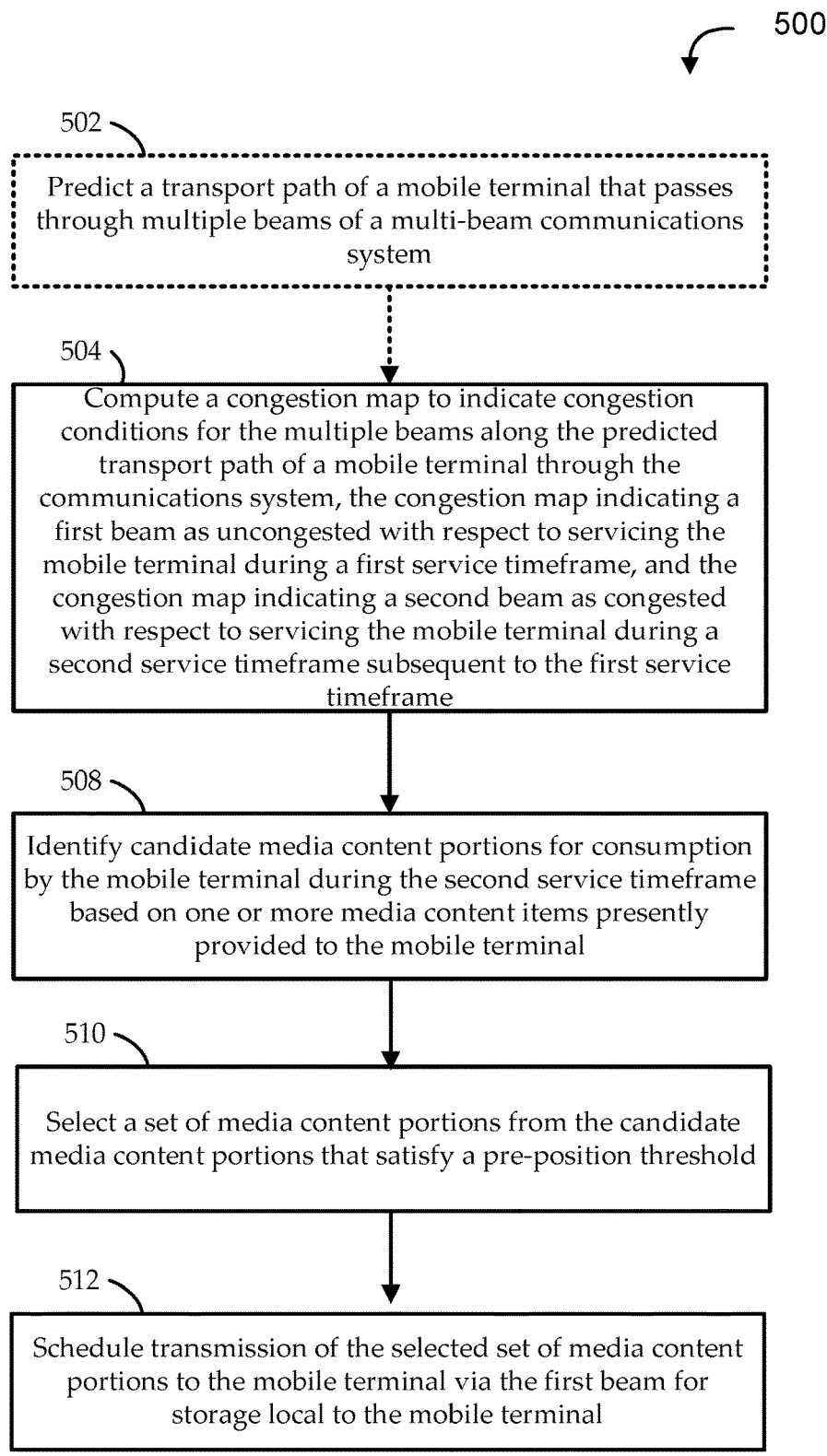
FIG. 5 shows a flow diagram of an illustrative method for providing transport path-aware quality of service to a mobile terminal along a predicted transport path through a multi-beam communications system, according to various embodiments.

FIG. 5 shows a flow diagram of an illustrative method 500 for providing transport path-aware quality of service to a mobile terminal along a predicted transport path through a multi-beam communications system, according to various embodiments. Embodiments of the method 500 can be performed by any suitable system, such as the management systems 140 described with reference to FIGS. 1, 2A, and 2B. Some embodiments of the method 500 begin by predicting the transport path of the mobile terminal at stage 502. For example, the transport path can be predicted according to received origin and destination locations and/or in any other suitable manner, and can be predicted directly for the mobile terminal or for an associated transport craft, group of mobile terminals, etc.

Embodiments of the method 500 can begin, or continue, at stage 504 by computing a congestion map to indicate congestion conditions for multiple beams of the multi-beam communications system along the predicted transport path. The congestion map can indicate a first beam as uncongested with respect to servicing the mobile terminal during a first service timeframe, and the congestion map can indicate a second beam (subsequent to the first beam along the predicted transport path) as congested with respect to servicing the mobile terminal during a second service timeframe subsequent to the first service timeframe. For example, computing the congestion map can involve computing congestion conditions of each of the first and second beams. The first beam can be the present beam or any subsequent beam along the predicted transport path; and the second beam can be directly adjacent to the first beam or any beam subsequent to the first beam along the predicted transport path.

At stage 508, embodiments can identify candidate media content portions for consumption by the mobile terminal during the second service timeframe based on one or more media content items presently provided to the mobile terminal. The candidate media content portions can be identified using the techniques described herein. As stage 510, embodiments can select a set of media content portions from the candidate media content portions that satisfy a pre-position threshold. The set of media content portions can be selected using the techniques described herein. At stage 512, embodiments can schedule transmission of the selected set of media content portions to the mobile terminal via the first beam for storage local to the mobile terminal.

Figure 6:
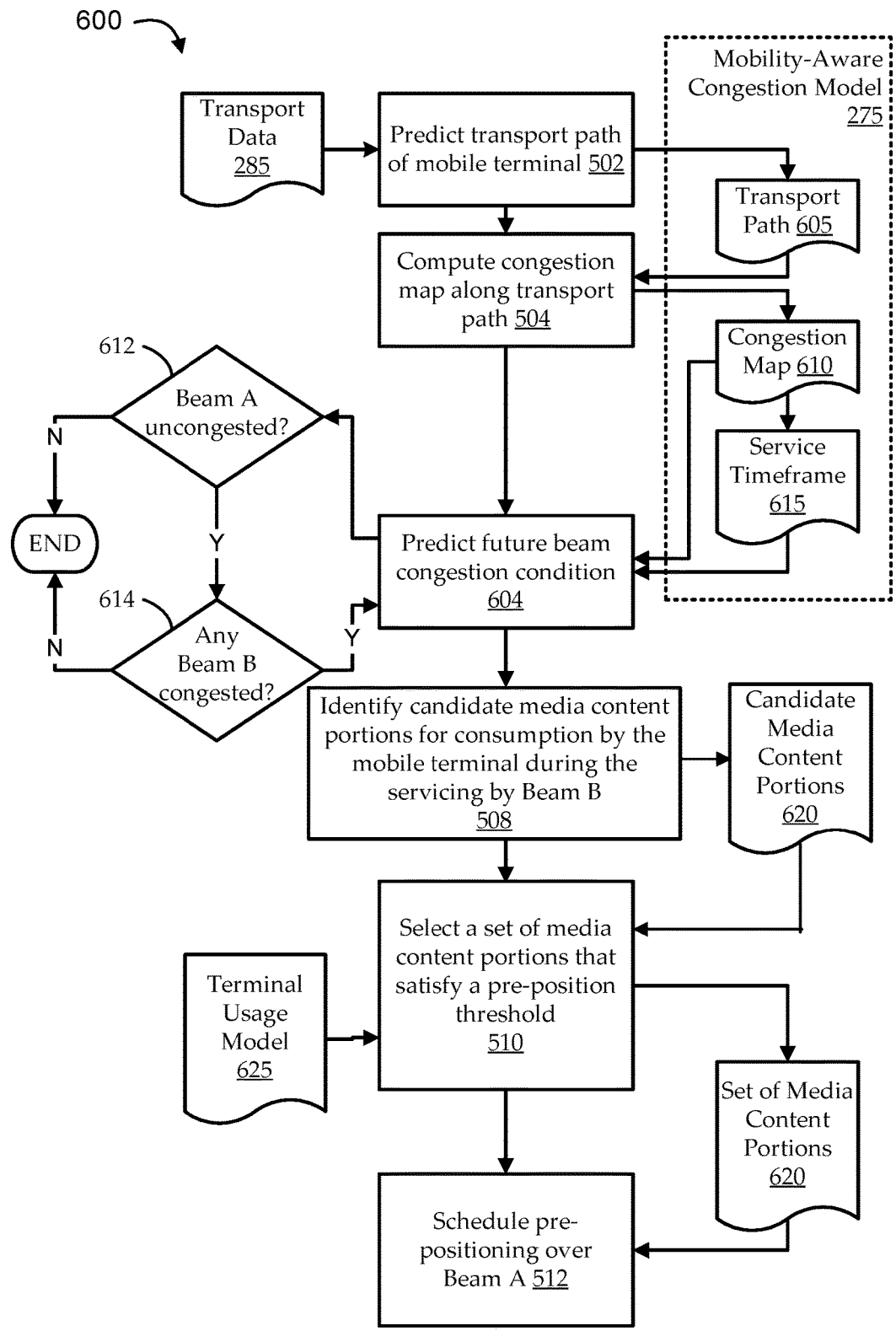
FIG. 6 shows a flow diagram of another illustrative method for providing transport path-aware quality of service to a mobile terminal along a predicted transport path through a multi-beam communications system, according to various embodiments.

FIG. 6 shows a flow diagram of another illustrative method 600 for providing transport path-aware quality of service to a mobile terminal along a predicted transport path through a multi-beam communications system, according to various embodiments. The method 600 is intended to further describe certain embodiments and is shown in context of various stages of method 500 (of FIG. 5) for added clarity. Embodiments can begin at stage 502 by predicting the transport path of the mobile terminal. The predicting can be performed according to various types of transport data 285, and can result in a predicted transport path 605 for the mobile terminal (or transport craft, etc.).

The transport path 605 can be used at stage 504 to compute a congestion map 610 for multiple beams along the predicted transport path 605. Some embodiments can further compute service timeframes 615 corresponding to beams of the congestion map 610. For example, the service timeframes 615 can indicate which of the beams is likely to be servicing the mobile terminal at which times as it travels along the transport path 605. In some embodiments, the service timeframes 615 are computed prior to computing the congestion map 610, so that the congestion map 610 accounts for predicted congestion of beams at their respective service timeframes 615. For example, as described above, embodiments can compute a mobility-aware congestion model 275 to include information according to the predicted transport path 605, the congestion map 610, and the service timeframes 615.

At stage 604, the congestion map 610 (or the mobility-aware congestion model 275) can be used to predict a future beam congestion condition. For example, the congestion map 610 can indicate one or more uncongested beams as preceding one or more congested beams along the predicted transport path 605. As illustrated, some embodiments can determine at stage 612 whether any first beam ("Beam A") is congested. If not, embodiments can indicate no congestion condition and may terminate the method 600. If so, such embodiments can further determine at stage 614 whether any subsequent beam ("Beam B") is congested. Again, if not, embodiments may not continue with the remainder of the method 600. If so, an appropriate type of congestion condition is assumed for triggering functionality described herein for pre-fulfilling pre-positionable consumption. Though not illustrated, the determination can be made in other suitable manners. For example, the method 600 can first determine at stage 614 whether there are any upcoming congested beams. If so, the determination can trigger a second determination of whether any preceding beam is uncongested at stage 612.

At stage 508, embodiments can identify candidate media content portions 620 for consumption by the mobile terminal during the servicing by second beam (Beam B). At stage 510, embodiments can select a set of media content portions that satisfy a pre-position threshold. The selection can be based at least in part on a terminal usage model 625, which can include, for example, present demand and/or capacity data 255, predicted demand and/or capacity data 265, and/or other data. In some embodiments, the selection can also based on for example, according to traffic type, content source, etc.

At stage 512, some or all of the selected set of media content portions 620 can be scheduled for transmission via the one or more beams identified as uncongested and preceding the one or more congested beams. The scheduling is performed in a manner that causes the selected set of media content portions 620, when received by the mobile terminal (or transport craft, etc.) to be locally stored, for example, in a terminal cache. As such, when the mobile terminal is traveling through the congested beam, it can retrieve pre-positioned content from its local cache, rather than receiving the content in real time from the congested beam (which may involve complex and/or resource-intensive techniques to support).

The methods disclosed herein include one or more actions for achieving the described method. The method and/or actions can be interchanged with one another without departing from the scope of the claims. In other words, unless a specific order of actions is specified, the order and/or use of specific actions can be modified without departing from the scope of the claims.

The functions described can be implemented in hardware, software, firmware, or any combination thereof. If implemented in software, the functions can be stored as one or more instructions on a tangible computer-readable medium. A storage medium can be any available tangible medium that can be accessed by a computer. By way of example, and not limitation, such computer-readable media can include RAM, ROM, EEPROM, CD-ROM, or other optical disk storage, magnetic disk storage, or other magnetic storage devices, or any other tangible medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

A computer program product can perform certain operations presented herein. For example, such a computer program product can be a computer readable tangible medium having instructions tangibly stored (and/or encoded) thereon, the instructions being executable by one or more processors to perform the operations described herein. The computer program product can include packaging material. Software or instructions can also be transmitted over a transmission medium. For example, software can be transmitted from a website, server, or other remote source using a transmission medium such as a coaxial cable, fiber optic cable, twisted pair, digital subscriber line (DSL), or wireless technology such as infrared, radio, or microwave.

Further, modules and/or other appropriate means for performing the methods and techniques described herein can be downloaded and/or otherwise obtained by suitable terminals and/or coupled to servers, or the like, to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized. Features implementing functions can also be physically located at various positions, including being distributed such that portions of functions are implemented at different physical locations.

In describing the present invention, the following terminology will be used: The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" means quantities, dimensions, sizes, formulations, parameters, shapes and other characteristics need not be exact, but can be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations including, for example, tolerances, measurement error, measurement accuracy limitations and other factors known to those of skill in the art, can occur in amounts that do not preclude the effect the characteristic was intended to provide. Numerical data can be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3 and 4 and sub-ranges such as 1-3, 2-4 and 3-5, etc. This same principle applies to ranges reciting only one numerical value (e.g., "greater than about 1") and should apply regardless of the breadth of the range or the characteristics being described. A plurality of items can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items can be used alone or in combination with other listed items. The term "alternatively" refers to selection of one of two or more alternatives, and is not intended to limit the selection to only those listed alternatives or to only one of the listed alternatives at a time, unless the context clearly indicates otherwise. The term "coupled" as used herein does not require that the components be directly connected to each other. Instead, the term is intended to also include configurations with indirect connections where one or more other components can be included between coupled components. For example, such other components can include amplifiers, attenuators, isolators, directional couplers, redundancy switches, and the like. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples. As used herein, a "set" of elements is intended to mean "one or more" of those elements, except where the set is explicitly required to have more than one or explicitly permitted to be a null set.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein can be utilized. Accordingly, the appended claims include within their scope such processes, machines, manufacture, compositions of matter, means, methods, or actions.

What is claimed is:

1. A mobility management system comprising a hardware processor for managing streaming media service to a plurality of terminals via a multi-carrier communications system to provide quality of service for delivery of media content over capacity-constrained communications links to in-transport terminals by exploiting usage model and path awareness, the mobility management system comprising:
   a congestion modeler system to compute a congestion map to indicate congestion conditions at corresponding service timeframes for a plurality of carriers of the multi-carrier communications system along a predicted transport path of a transport craft vehicle traveling through the multi-carrier communications system, the transport craft vehicle having a plurality of user devices disposed therein, wherein, in a first service timeframe of the service timeframes, during which the transport craft vehicle will be serviced by a first carrier of the plurality of carriers, the congestion map indicates the first carrier as uncongested with respect to servicing a first plurality of terminals comprising the transport craft vehicle, and wherein, in a second service timeframe of the service timeframes, during which the transport craft vehicle will be serviced by a second carrier of the plurality of carriers, the congestion map indicates the second carrier as congested with respect to servicing a second plurality of terminals comprising the transport craft vehicle, the second service timeframe being subsequent to the first service timeframe;

a pre-positioning system to identify candidate media content portions predicted to be consumed by at least one of the second plurality of terminals during the second service timeframe; and a mobility-aware scheduler system to schedule transmission, based on the congestion conditions indicated from the congestion map, of at least some of the candidate media content portions to the at least one of the second plurality of terminals during the first service timeframe for local storage by the at least one of the second plurality of terminals.

2. The mobility management system of claim 1, wherein the congestion map indicates the second carrier as congested with respect to servicing the second plurality of terminals due at least to the transport craft vehicle being serviced by the second carrier of the plurality of carriers in the second service timeframe.

3. The mobility management system of claim 1, wherein:
the candidate media content portions are portions of one or more media content items; and
the pre-positioning system is to identify the candidate media content portions predicted to be consumed by at least one of the second plurality of terminals during the second service timeframe based at least in part on identifying the one or more media content items as being provided to the at least one of the second plurality of terminals via the multi-carrier communications system in the first service timeframe.

4. The mobility management system of claim 1, wherein the pre-positioning system is to identify the set of candidate media content portions based at least in part on a period of time until the second service timeframe.

5. The mobility management system of claim 1, wherein the mobility-aware scheduler system is to schedule transmission of at least some of the candidate media content portions to the at least one of the second plurality of terminals during the first service timeframe via the first carrier of the plurality of carriers.

6. The mobility management system of claim 1, wherein the second service timeframe is adjacent to the first service timeframe.

7. The mobility management system of claim 1, wherein the second carrier of the plurality of carriers is different from the first carrier of the plurality of carriers.

8. The mobility management system of claim 1, wherein the second carrier of the plurality of carriers is immediately subsequent to the first carrier of the plurality of carriers along the predicted transport path.

9. The mobility management system of claim 1, wherein the at least one of the second plurality of terminals is the transport craft vehicle.

10. The mobility management system of claim 1, wherein the at least one of the second plurality of terminals is a fixed terminal disposed in a coverage area of the second carrier of the plurality of carriers.

11. The mobility management system of claim 1, wherein the first plurality of terminals comprises the at least one of the second plurality of terminals.

12. The mobility management system of claim 1, wherein the multi-carrier communications system is a multi-beam satellite communications system, the first carrier being a first beam of the multi-beam satellite communications system, and the second carrier being a second beam of the multi-beam satellite communications system.

13. The mobility management system of claim 1, further comprising:
a terminal usage modeler system to select a set of media content portions from the candidate media content portions that satisfy a pre-position threshold,
wherein the at least some of the candidate media content portions is the set of media content portions.

14. The mobility management system of claim 13, wherein the pre-position threshold is based at least in part on one or more of: available capacity of the first carrier during the first service timeframe, a length of time of the second service timeframe, available capacity of one or more carriers preceding the second carrier along the predicted transport path, or available capacity of one or more carriers subsequent to the second carrier along the predicted transport path.

15. The mobility management system of claim 13, wherein the pre-position threshold is based at least in part on available storage space local to the at least one of the second plurality of terminals.

16. The mobility management system of claim 1, further comprising:
a transport path modeler system to determine the predicted transport path of the transport craft vehicle.

17. A computer processor-implemented method for managing streaming media service to a plurality of terminals via a multi-carrier communications system to provide quality of service for delivery of media content over capacity-constrained communications links to in-transport terminals by exploiting usage model and path awareness, the method comprising:
computing a congestion map to indicate congestion conditions at corresponding service timeframes for a plurality of carriers of the multi-carrier communications system along a predicted transport path of a transport craft vehicle traveling through the multi-carrier communications system, the transport craft vehicle having a plurality of user devices disposed therein, wherein, in a first service timeframe of the service timeframes, during which the transport craft vehicle will be serviced by a first carrier of the plurality of carriers, the congestion map indicates the first carrier as uncongested with respect to servicing a first plurality of terminals comprising the transport craft vehicle, and wherein, in a second service timeframe of the service timeframes, during which the transport craft vehicle will be serviced by a second carrier of the plurality of carriers, the congestion map indicates the second carrier as congested with respect to servicing a second plurality of terminals comprising the transport craft vehicle, the second service timeframe being subsequent to the first service timeframe;

identifying candidate media content portions predicted to be consumed by at least one of the second plurality of terminals during the second service timeframe; and scheduling transmission, based on the congestion conditions indicated from the congestion map, of at least some of the candidate media content portions to the at least one of the second plurality of terminals during the first service timeframe for local storage by the at least one of the second plurality of terminals.

18. The method of claim 17, wherein the congestion map indicates the second carrier as congested with respect to servicing the second plurality of terminals due at least to the transport craft vehicle being serviced by the second carrier of the plurality of carriers in the second service timeframe.

19. The method of claim 17, wherein:
the candidate media content portions are portions of one or more media content items; and
the identifying is based at least in part on further identifying the one or more media content items as being provided to the at least one of the second plurality of terminals via the multi-carrier communications system in the first service timeframe.

20. The method of claim 17, wherein the identifying is based at least in part on a period of time until the second service timeframe.

21. The method of claim 17, wherein the scheduling is via the first carrier of the plurality of carriers.

22. The method of claim 17, wherein the second service timeframe is adjacent to the first service timeframe.

23. The method of claim 17, wherein the second carrier of the plurality of carriers is different from the first carrier of the plurality of carriers.

24. The method of claim 17, wherein the second carrier of the plurality of carriers is immediately subsequent to the first carrier of the plurality of carriers along the predicted transport path.

25. The method of claim 17, wherein the at least one of the second plurality of terminals is the transport craft vehicle.

26. The method of claim 17, wherein the at least one of the second plurality of terminals is a fixed terminal disposed in a coverage area of the second carrier of the plurality of carriers.

27. The method of claim 17, wherein the first plurality of terminals comprises the at least one of the second plurality of terminals.

28. The method of claim 17, wherein the multi-carrier communications system is a multi-beam satellite communications system, the first carrier being a first beam of the multi-beam satellite communications system, and the second carrier being a second beam of the multi-beam satellite communications system.

29. The method of claim 17, further comprising:
selecting a set of media content portions from the candidate media content portions that satisfy a pre-position threshold,
wherein the at least some of the candidate media content portions is the set of media content portions.

30. The method of claim 17, wherein the pre-position threshold is based at least in part on one or more of: available capacity of the first carrier during the first service timeframe, a length of time of the second service timeframe, available capacity of one or more carriers preceding the second carrier along the predicted transport path, or available capacity of one or more carriers subsequent to the second carrier along the predicted transport path.

31. The method of claim 17, wherein the pre-position threshold is based at least in part on available storage space local to the at least one of the second plurality of terminals.

32. The method of claim 17, further comprising:
determining the predicted transport path of the transport craft vehicle.

* * * * *